(12) United States Patent
Shintou et al.

(10) Patent No.: US 10,647,142 B2
(45) Date of Patent: May 12, 2020

(54) THERMAL TRANSFER RECORDING SHEET

(71) Applicant: CANON KABUSHIKI KAISHA, Tokyo (JP)

(72) Inventors: Taichi Shintou, Saitama (JP); Masahiro Suenaga, Yokohama (JP); Koromo Shirota, Kawasaki (JP); Yuko Katsumoto, Yokohama (JP); Tsuyoshi Santo, Yokohama (JP); Hajime Muta, Zama (JP); Tomoyuki Noda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/844,267

(22) Filed: Dec. 15, 2017

(65) Prior Publication Data
US 2018/0170085 A1 Jun. 21, 2018

(30) Foreign Application Priority Data

Dec. 20, 2016 (JP) .................................. 2016-247122
Nov. 6, 2017 (JP) .................................. 2017-213857

(51) Int. Cl.
| | |
|---|---|
| B41M 5/323 | (2006.01) |
| C09D 11/106 | (2014.01) |
| C09B 11/12 | (2006.01) |
| C09B 1/16 | (2006.01) |
| C09B 53/00 | (2006.01) |
| C09B 23/04 | (2006.01) |
| C09B 57/00 | (2006.01) |
| C09B 23/14 | (2006.01) |
| C09B 29/42 | (2006.01) |
| C09B 1/50 | (2006.01) |
| C09B 23/16 | (2006.01) |
| C09B 29/08 | (2006.01) |
| B41M 5/34 | (2006.01) |
| C09D 11/037 | (2014.01) |
| B41M 5/39 | (2006.01) |
| C08K 5/435 | (2006.01) |
| C08K 5/29 | (2006.01) |
| C08K 5/18 | (2006.01) |
| C08K 5/47 | (2006.01) |
| C08K 5/3445 | (2006.01) |
| C08K 5/3437 | (2006.01) |

(Continued)

(52) U.S. Cl.
CPC ............ B41M 5/323 (2013.01); B41M 5/345 (2013.01); B41M 5/39 (2013.01); C09B 1/16 (2013.01); C09B 1/50 (2013.01); C09B 11/12 (2013.01); C09B 23/04 (2013.01); C09B 23/143 (2013.01); C09B 23/164 (2013.01); C09B 29/0808 (2013.01); C09B 29/3617 (2013.01); C09B 53/00 (2013.01); C09B 57/00 (2013.01); C09D 11/037 (2013.01); C09D 11/106 (2013.01); B41M 5/388 (2013.01); B41M 5/3852 (2013.01); B41M 5/3858 (2013.01); C08K 5/18 (2013.01); C08K 5/29 (2013.01); C08K 5/315 (2013.01); C08K 5/3432 (2013.01); C08K 5/3437 (2013.01); C08K 5/3445 (2013.01); C08K 5/3472 (2013.01); C08K 5/435 (2013.01); C08K 5/47 (2013.01)

(58) Field of Classification Search
CPC .... B41M 5/345; B41M 5/385; B41M 5/3852; B41M 5/3858; B41M 5/388; B41M 5/389; B41M 2205/02; C09B 11/12
USPC ........................................ 503/227; 428/32.75
See application file for complete search history.

(56) References Cited

U.S. PATENT DOCUMENTS 8,440,589 B2 * 5/2013 Sanada et al. ........... B41M 5/39
503/227

FOREIGN PATENT DOCUMENTS

| EP | 0524637 A1 | 1/1993 |
|---|---|---|
| EP | 1493593 A1 | 1/2005 |

(Continued)

OTHER PUBLICATIONS

Machine translation of WO 2016/039272 A1 acquired on Jul. 16, 2019.*

*Primary Examiner* — Gerard Higgins
(74) *Attorney, Agent, or Firm* — Canon U.S.A. Inc., IP Division

(57) ABSTRACT

In a thermal transfer recording sheet including a base material and a colorant layer, the colorant layer includes a yellow dye layer containing a yellow dye, a magenta dye layer containing a magenta dye, and a cyan dye layer containing a cyan dye, and the cyan dye includes a compound represented by Formula (1a) or Formula (1b):

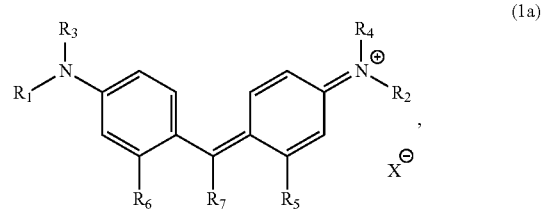

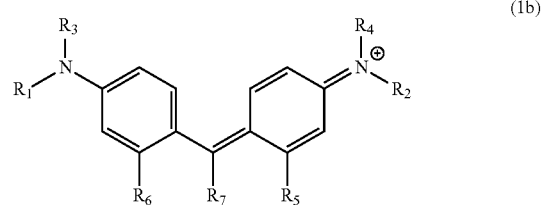

(Continued)

where $R_1$ to $R_7$ are substituents, $X^-$ is an anion, and the compound of Formula (1b) has at least one anionic substituent.

9 Claims, No Drawings

(51) Int. Cl.
    *C08K 5/315*     (2006.01)
    *C08K 5/3432*     (2006.01)
    *C08K 5/3472*     (2006.01)
    *B41M 5/385*     (2006.01)
    *B41M 5/388*     (2006.01)

(56) References Cited

FOREIGN PATENT DOCUMENTS

| | | |
|---|---|---|
| JP | 61-141593 A | 6/1986 |
| JP | 3-103846 A | 4/1991 |
| WO | 08/114886 A1 | 9/2008 |
| WO | 2016/039272 A1 | 3/2016 |

\* cited by examiner

THERMAL TRANSFER RECORDING SHEET

BACKGROUND OF THE INVENTION

Field of the Invention

The present disclosure relates to a thermal transfer recording sheet.

Description of the Related Art

In recent years, due to the popularization of portable color display devices, demand for easily printing color photographs or documents photographed or produced with such devices is rapidly increasing. As color printing systems responding to such demand, for example, an electrophotographic system, an ink jet system, and a thermal transfer recording system are known. In particular, the thermal transfer recording system can perform printing by a dry process and is compact and excellent in portability as a printer and is therefore excellent as a method that allows easy printing regardless of the surrounding environment. In addition, since dyes are used as colorant, the system can express shades of an image by the density gradation of the color materials and is excellent in clearness and color reproducibility of an image.

The thermal transfer recording system is an image forming method by stacking, on a base material, a thermal transfer recording sheet having a colorant layer containing a heat-transferable dye and an image-receiving sheet having a surface provided with a dye-receiving layer and heating the thermal transfer recording sheet to transfer the colorant supported on the thermal transfer recording sheet to the image-receiving sheet to achieve recording.

As such a thermal transfer recording system, it is well known to form an image by stacking a colorant layer containing a yellow dye, a colorant layer containing a magenta dye, and a colorant layer containing a cyan dye. In this case, black is expressed by mixing the above-mentioned three colorant layers (process black). In order to obtain process black having a high optical density, the reflection spectrum in the visible light region when dyes of the above-mentioned three colors are combined is required to show low reflectivity. However, a high saturation dye having a steep and narrow absorption spectrum tends to be used with an increase in desire for clearness and color reproducibility of an image, leading to insufficient absorption of wavelength components in color mixing. As a result, process black having a high optical density cannot be expressed. Japanese Patent Laid-Open No. 61-141593 describes a method of forming a thermal transfer recorded matter having high lightness involving by using a triarylmethane compound as a cyan dye.

SUMMARY OF THE INVENTION

According to investigations by the present inventors, the thermal transfer recording sheet described in Japanese Patent Laid-Open No. 61-141593 still needs an improvement in compatibility between color gamut expansion in the blue direction and process black having a high optical density.

The present disclosure can provide a thermal transfer recording sheet capable of forming an image having compatibility between color gamut expansion in the blue direction and process black having a high optical density.

The present disclosure relates to a thermal transfer recording sheet including a base material and a colorant layer on the base material, wherein the colorant layer includes a yellow dye layer containing a yellow dye, a magenta dye layer containing a magenta dye, and a cyan dye layer containing a cyan dye; and the cyan dye comprises a compound represented by Formula (1a) or Formula (1b):

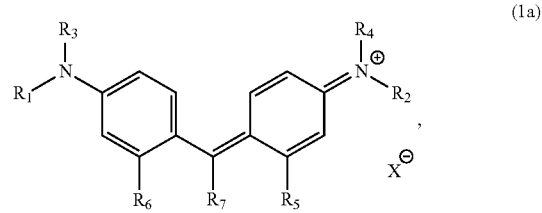

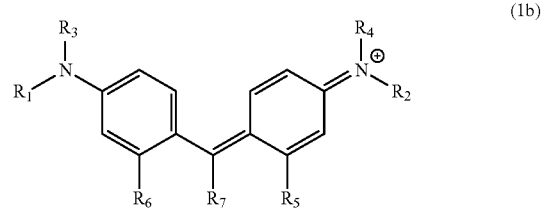

where $R_1$ and $R_2$ each independently represent an alkyl group, a substituted or unsubstituted aryl group, or a benzyl group;

$R_3$ and $R_4$ each independently represent a hydrogen atom, an alkyl group, a substituted or unsubstituted aryl group, or a benzyl group;

$R_5$ and $R_6$ each independently represent a hydrogen atom, or an alkyl group;

$R_7$ represents a substituted or unsubstituted aryl group, or a substituted or unsubstituted heteroaromatic group; and $X^-$ represents an anion and need not be present when the compound has at least one anionic substituent in the molecule.

Further features of the present disclosure will become apparent from the following description of exemplary embodiments.

DESCRIPTION OF THE EMBODIMENTS

The present disclosure will now be described in more detail.

The present inventors have diligently studied for solving the above-described problems and, as a result, have found that in a thermal transfer recording sheet including a base material and a colorant layer, when the colorant layer includes a yellow dye layer containing a yellow dye, a magenta dye layer containing a magenta dye, and a cyan dye layer containing a cyan dye and the cyan dye comprises a compound represented by Formula (1a) or Formula (1b), an image having compatibility between color gamut expansion in the blue direction and process black having a high optical density can be formed.

Cyan Dye

The compound represented by Formula (1a) or Formula (1b) included in the cyan dye will be described.

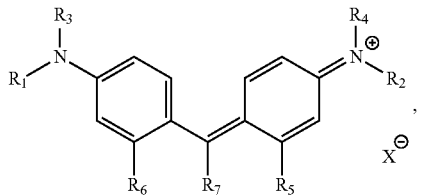

(1a)

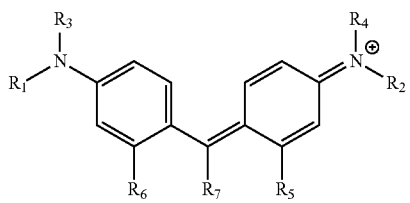

(1b)

where, $R_1$ and $R_2$ each independently represent an alkyl group, a substituted or unsubstituted aryl group, or a benzyl group;

$R_3$ and $R_4$ each independently represent a hydrogen atom, an alkyl group, a substituted or unsubstituted aryl group, or a benzyl group;

$R_5$ and $R_6$ each independently represent a hydrogen atom, or an alkyl group;

$R_7$ represents a substituted or unsubstituted aryl group, or a substituted or unsubstituted heteroaromatic group; and $X^-$ represents an anion and need not be present when the compound has at least one anionic substituent in the molecule.

In Formula (1a) and Formula (1b), examples of the alkyl group represented by $R_1$, $R_2$, $R_3$, or $R_4$ include, but not limited to, linear, branched, or cyclic primary, secondary, or tertiary alkyl groups having 1 to 20 carbon atoms, such as a methyl group, an ethyl group, an n-propyl group, an isopropyl group, an n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl group, and a 2-ethylhexyl group.

Among these groups, the alkyl group can be an ethyl group, an n-butyl group, a sec-butyl group, a dodecyl group, a cyclohexyl group, a methylcyclohexyl group, a 2-ethylpropyl group, a 2-ethylhexyl group, or an octyl group, in particular, an n-butyl group, a 2-ethylhexyl group, or an octyl group. When $R_1$ and $R_2$ are the same alkyl groups, an image having compatibility between color gamut expansion in the blue direction and process black having a high optical density can be formed.

In Formula (1a) and Formula (1b), examples of the substituted or unsubstituted aryl group represented by $R_1$, $R_2$, $R_3$, or $R_4$ include, but not limited to, a phenyl group. Examples of the substituent of the substituted aryl group include, but not limited to, a methyl group, an ethyl group, a methoxy group, and a cyano group.

In Formula (1a) and Formula (1b), examples of the alkyl group represented by $R_5$ or $R_6$ include, but not limited to, a methyl group, an ethyl group, an n-propyl group, an isopropyl group, and an n-butyl group.

Among these alkyl groups, $R_5$ and $R_6$ can be each independently a methyl group or an ethyl group, in particular, a methyl group, from the viewpoint of forming an image having compatibility between color gamut expansion in the blue direction and process black having a high optical density.

In Formula (1a) and Formula (1b), examples of the substituted or unsubstituted aryl group represented by $R_7$ include, but not limited to, a phenyl group, a naphthyl group, an anthranil group, and a tetrahydronaphthyl group.

In Formula (1a) and Formula (1b), the substituted or unsubstituted heteroaromatic group represented by $R_7$ include, but not limited to, an imidazole group, an oxazole group, a thiazole group, a pyridinyl group, a pyrazyl group, a quinolyl group, and an indolyl group.

In Formula (1a) and Formula (1b), examples of the anion represented by $X^-$ include, but not limited to, a fluorine ion, a chlorine ion, a bromine ion, an iodine ion, a cyanide ion, a perchlorate anion, a trifluoromethanesulfonyl anion, a bis(trifluoromethanesulfonyl)imide anion, a naphthalenesulfonyl ion, a tris(trifluromethanesulfonyl)methide anion, a tetraarylborate anion, and a sulfate anion.

In Formula (1a) and Formula (1b), when $R_7$ represents a group represented by any of the following Formulae (5) to (7), an image having compatibility between color gamut expansion in the blue direction and process black having a high optical density can be formed.

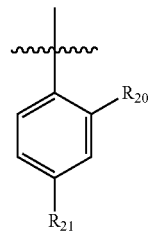

(5)

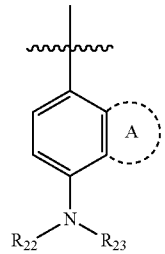

(6)

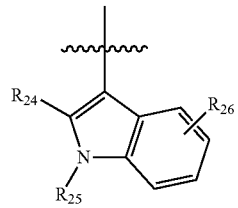

(7)

in Formula (5), $R_{20}$ represents a sulfonyl group, a halogen atom, a perfluoroalkyl group, or a nitro group, in particular, a sulfonyl group, a halogen atom, or a perfluoroalkyl group; and $R_{21}$ represents a hydrogen atom or a sulfonyl group;

in Formula (6), $R_{22}$ and $R_{23}$ each independently represent a hydrogen atom, an alkyl group, a substituted or unsubstituted aryl group, or a benzyl group; and A optionally has a benzene ring or a cyclohexyl ring; and in Formula (7), $R_{24}$ and $R_{25}$ each independently represent an alkyl group or a substituted or unsubstituted aryl group; and $R_{26}$ represents a hydrogen atom, an alkyl group, or a substituted or unsubstituted aryl group.

In Formula (5), examples of the sulfonyl group represented by $R_{20}$ or $R_{21}$ include, but not limited to, a sulfonic acid group, a sulfonic acid amide group, and a sulfonic acid ester group; examples of the halogen atom represented by $R_{20}$ include, but not limited to, a fluorine atom, a chlorine atom, a bromine atom, and an iodine atom; and examples of the perfluoroalkyl group represented by $R_{20}$ include, but not limited to, a trifluoromethyl group, a perfluoroethyl group, and a perfluoropropyl group.

In Formula (6), examples of the alkyl group represented by $R_{22}$ or $R_{23}$ include the groups exemplified as the alkyl group represented by $R_1$, $R_2$, $R_3$, or $R_4$ in Formula (1a) and Formula (1b).

In Formula (6), examples the substituted or unsubstituted aryl group represented by $R_{22}$ or $R_{23}$ include, but not limited to, a phenyl group; and examples of the substituent of the substituted aryl group include, but not limited to, a methyl group, an ethyl group, a methoxy group, and a cyano group.

In Formula (7), examples of the alkyl group represented by $R_{24}$, $R_{25}$, or $R_{26}$ includes the groups exemplified as the alkyl group represented by $R_1$, $R_2$, $R_3$, or $R_4$ in Formula (1a) and Formula (1b).

In Formula (7), examples of the substituted or unsubstituted aryl group represented by $R_{24}$, $R_{25}$, or $R_{26}$ include, but not limited to, a phenyl group; and examples of the substituent of the substituted aryl group include, but not limited to, a methyl group, an ethyl group, a methoxy group, and a cyano group.

In Formula (1a) and Formula (1b), $R_7$ can be a group represented by Formula (8):

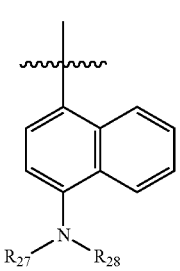

(8)

where, $R_{27}$ and $R_{28}$ each independently represent a hydrogen atom, an alkyl group, a substituted or unsubstituted aryl group, or a benzyl group.

In Formula (8), examples of the alkyl group represented by $R_{27}$ or $R_{28}$ include the groups exemplified as the alkyl group represented by $R_1$, $R_2$, $R_3$, or $R_4$ in Formula (1a) and Formula (1b).

In Formula (8), examples of the substituted or unsubstituted aryl group represented by $R_{27}$ or $R_{28}$ include the groups exemplified as the substituted or unsubstituted aryl group represented by $R_1$, $R_2$, $R_3$, or $R_4$ in Formula (1a) and Formula (1b).

Examples of the compound represented by Formula (1a) or Formula (1b) include, but not limited to, Compounds (A1) to (A45) shown below. The compounds represented by Formula (1a) or Formula (1b) may be used alone or in combination of two or more thereof.

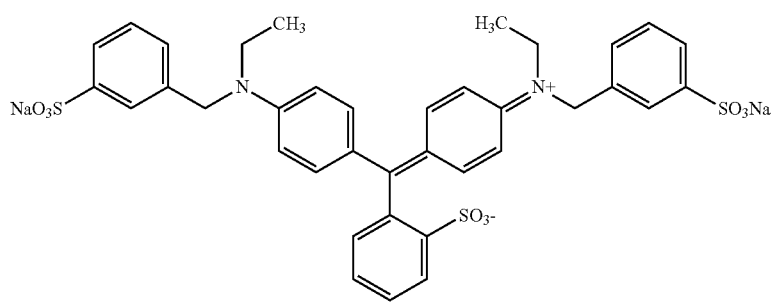

(A1)

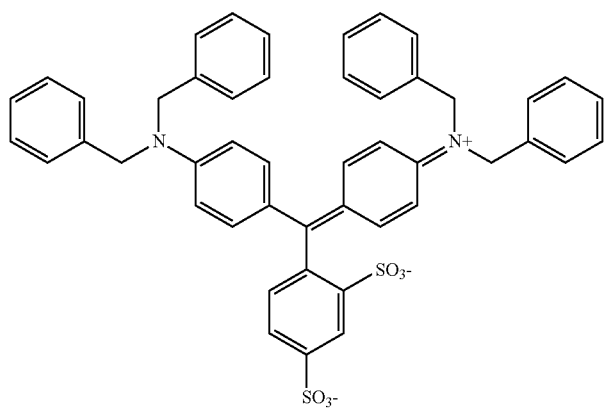

(A2)

-continued
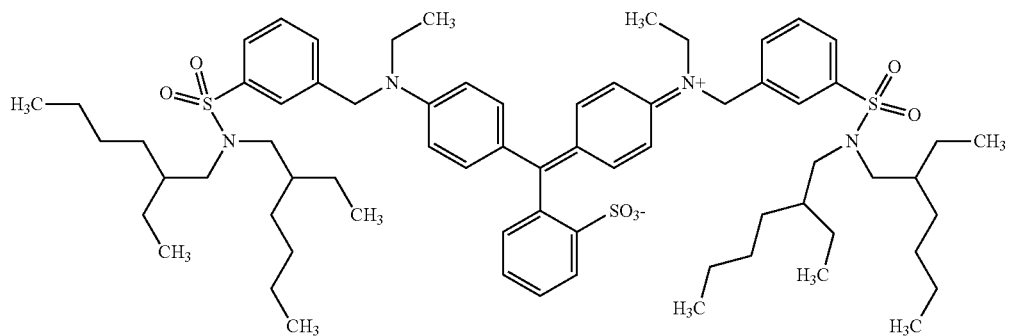
(A3)
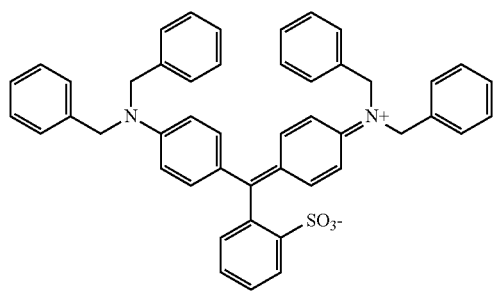
(A4)
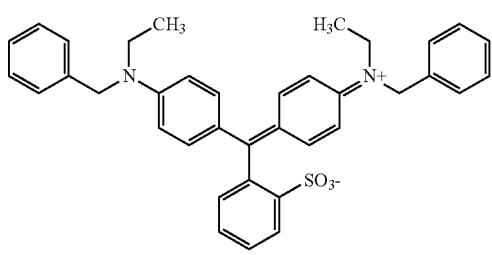
(A5)
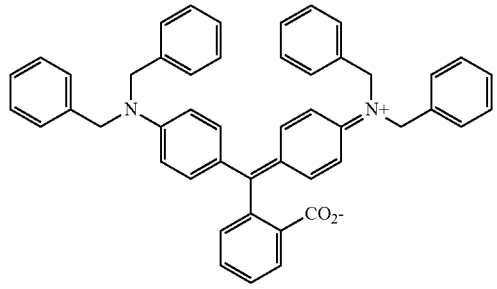
(A6)
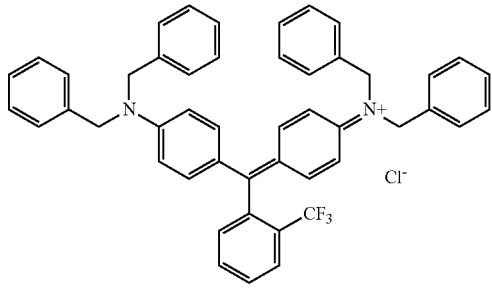
(A7)
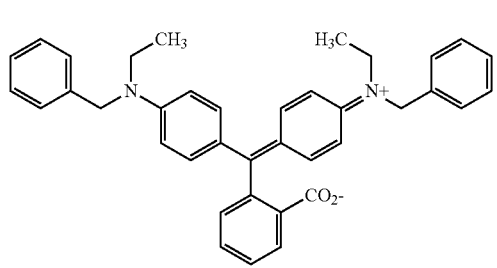
(A8)
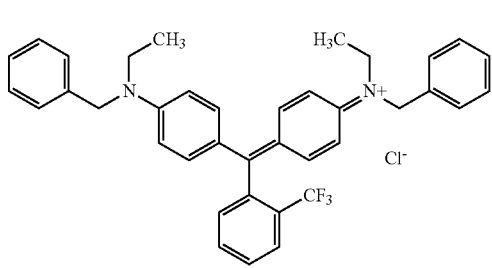
(A9)
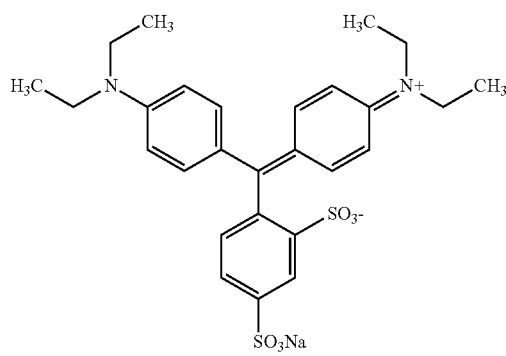
(A10)

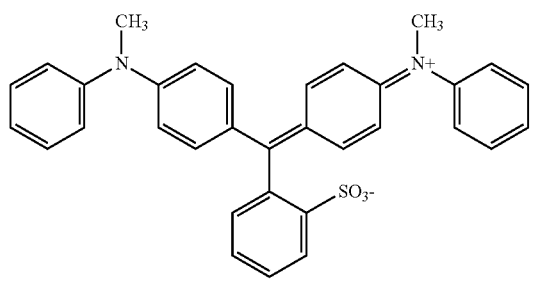
(A11)
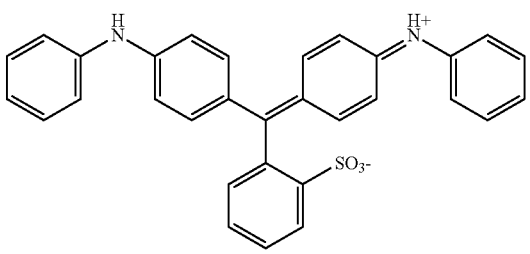
(A12)
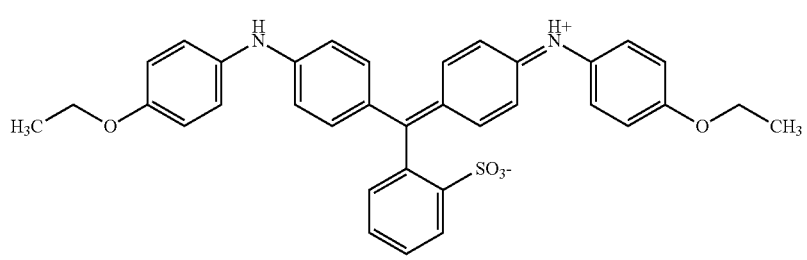
(A13)
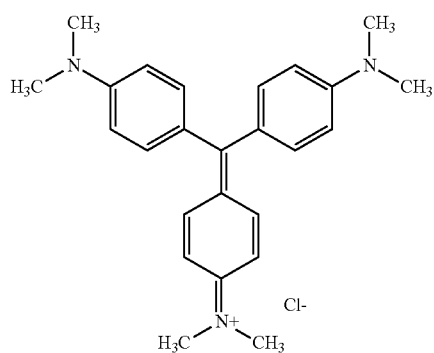
(A14)
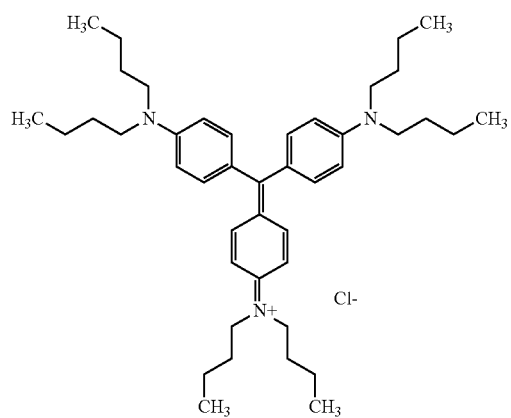
(A15)
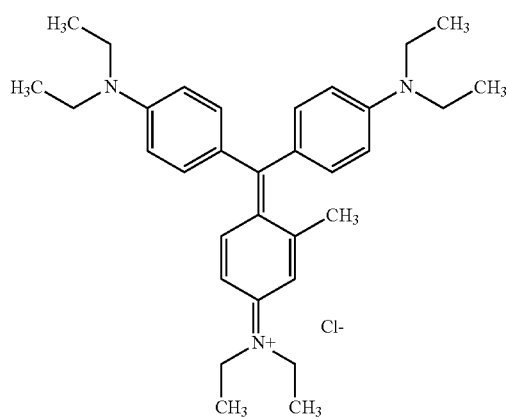
(A16)
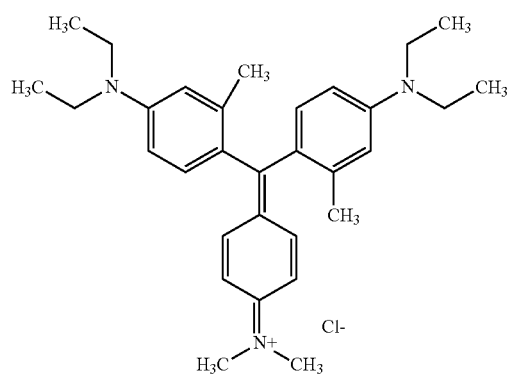
(A17)

-continued
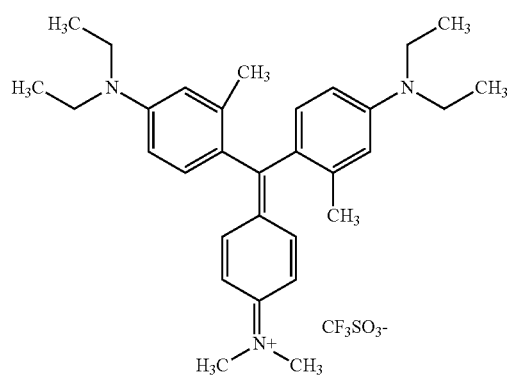
(A18)
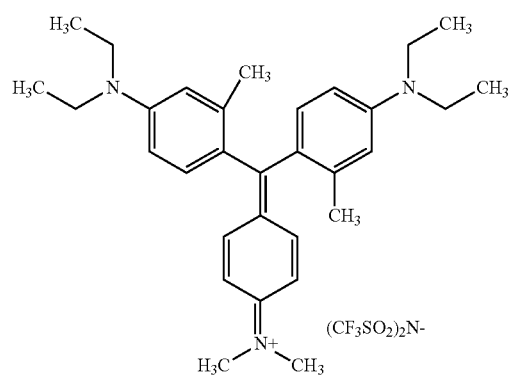
(A19)
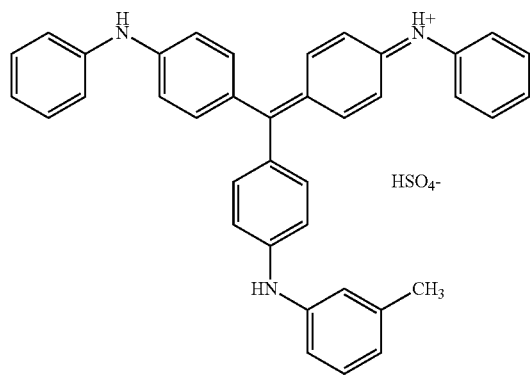
(A20)
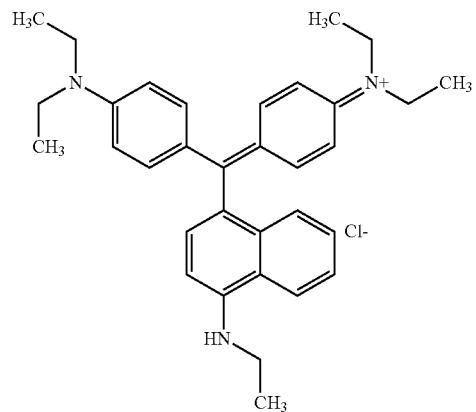
(A21)
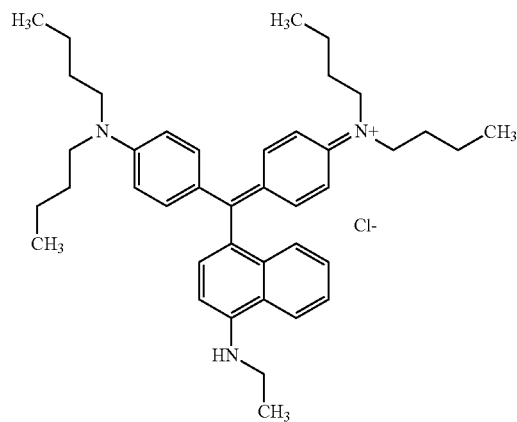
(A22)
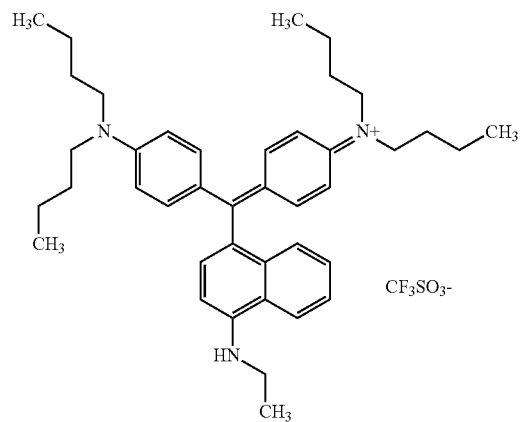
(A23)

-continued
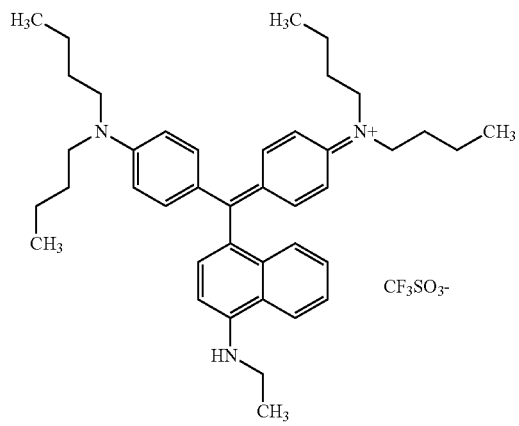
(A24)
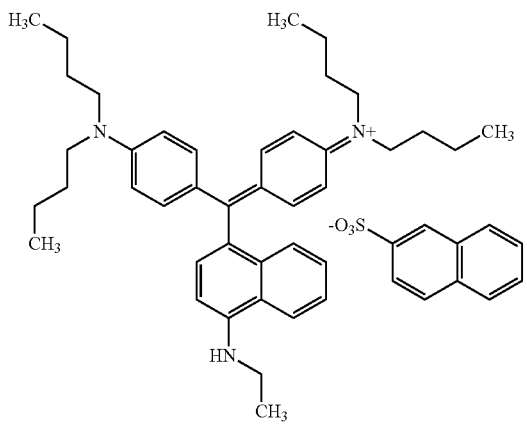
(A25)
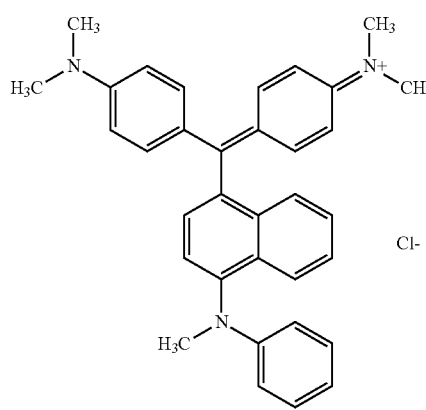
(A26)
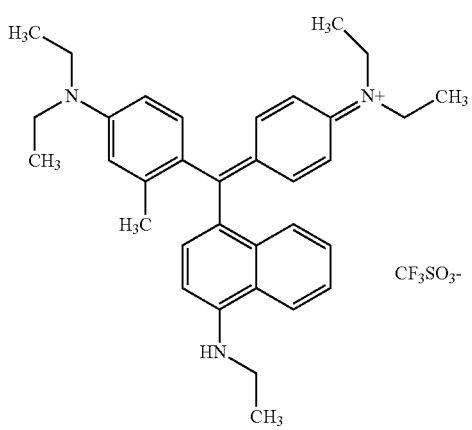
(A27)
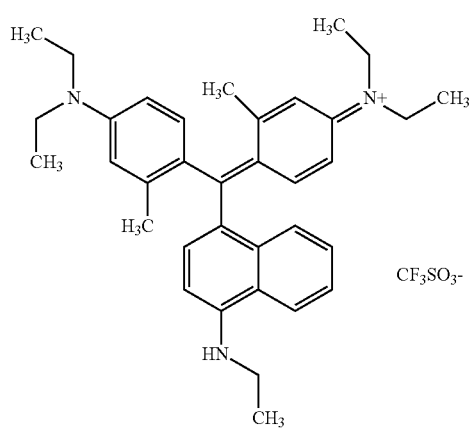
(A28)
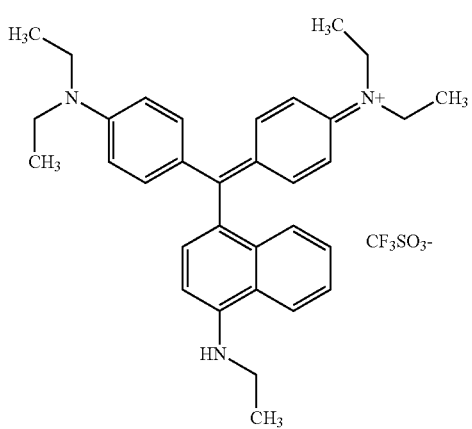
(A29)

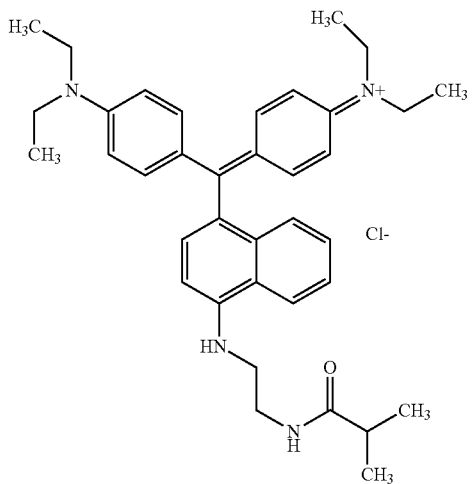
(A30)
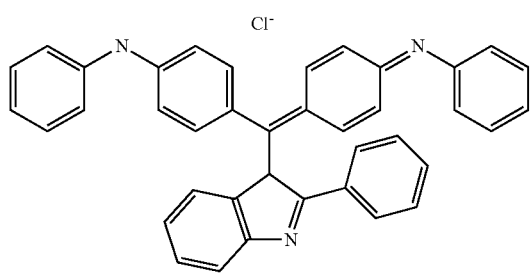
(A31)
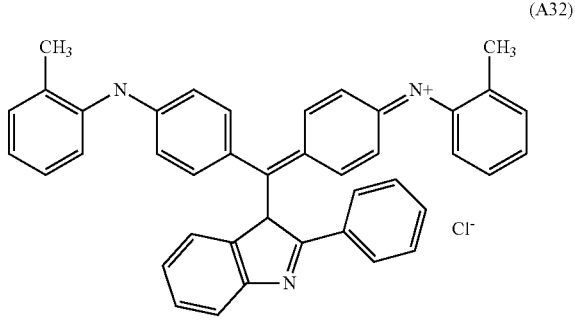
(A32)
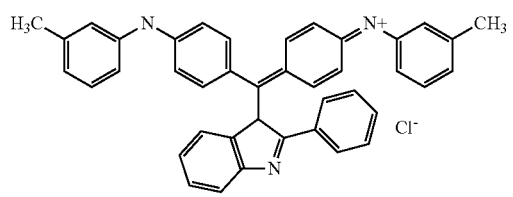
(A33)
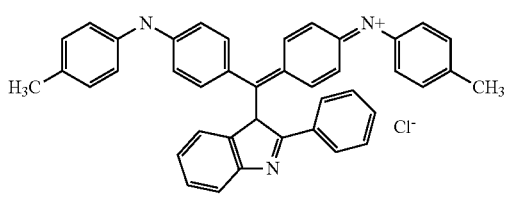
(A34)
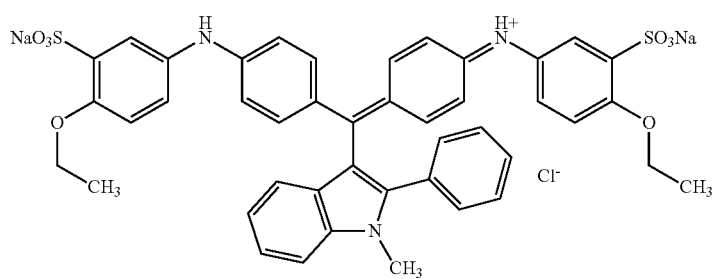
(A35)

-continued
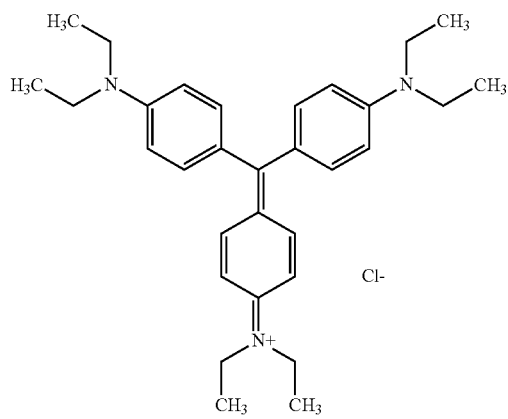
(A36)
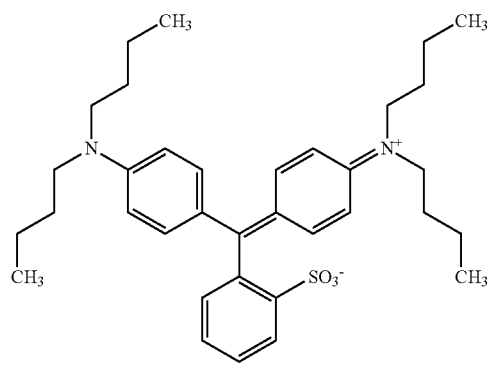
(A37)
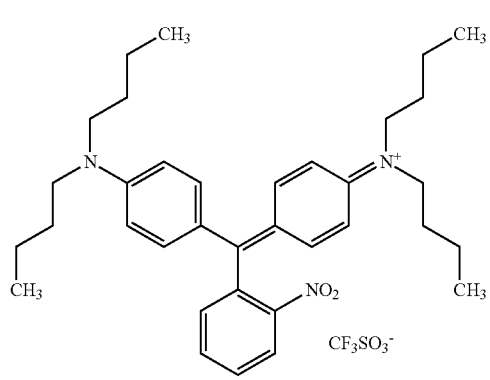
(A38)
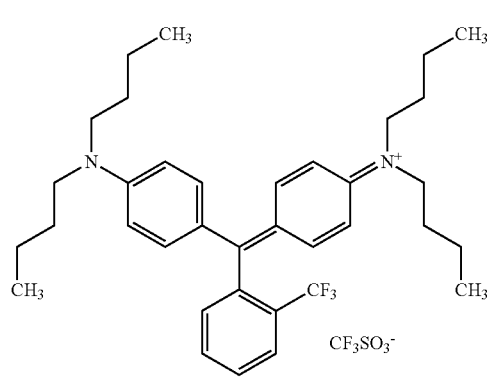
(A39)
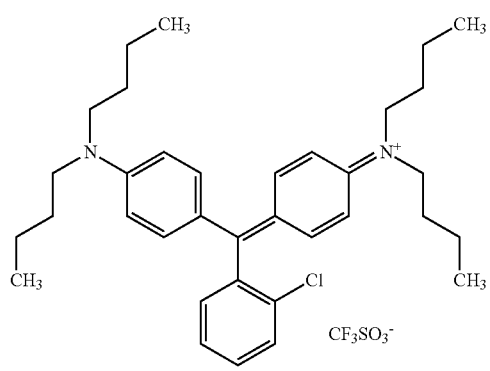
(A40)
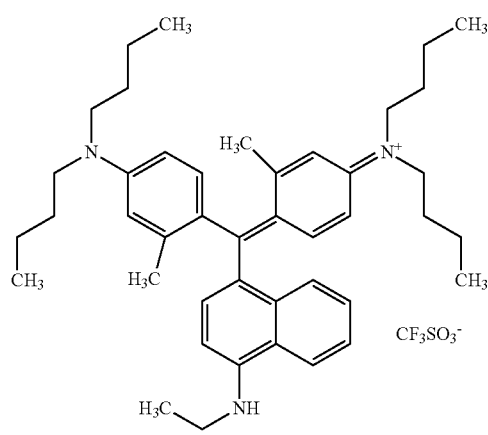
(A41)
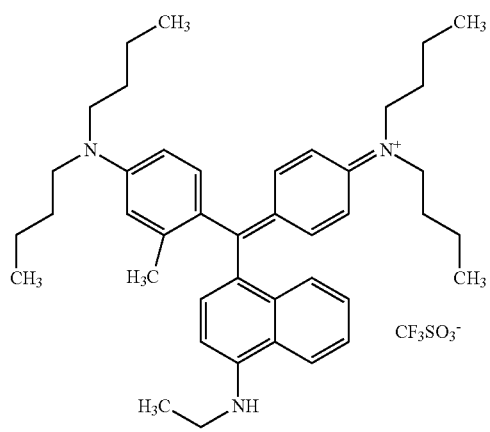
(A42)
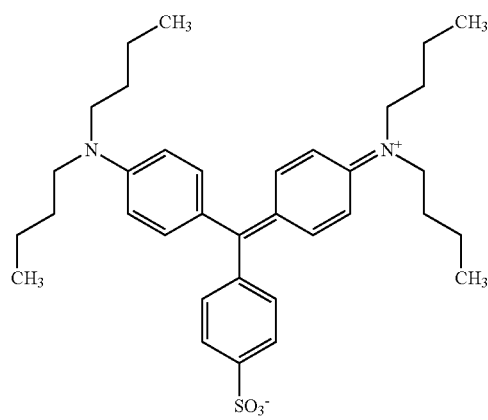
(A43)

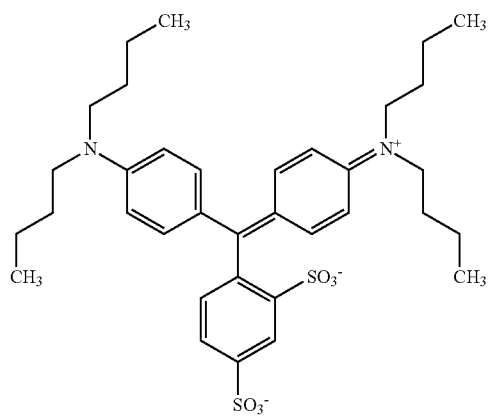

(A44)

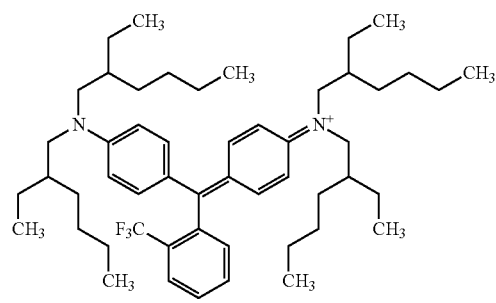

(A45)

Among these compounds, the cyan dye can include Compound (A2), (A4), (A5), (A15), (A16), (A17), (A18), (A19), (A21), (A22), (A23), (A24), (A25), (A27), (A28), (A29), (A34), (A37), (A38), (A39), (A40), (A41), (A42), (A44), or (A45), in particular, Compound (A17), (A18), (A21), (A22), (A23), (A24), (A29), (A37), (A38), (A39), (A40), or (A41), from the viewpoint of forming an image having compatibility between color gamut expansion in the blue direction and process black having a high optical density.

In the compounds represented by Formula (1a) or Formula (1b), the cation is delocalized, and the cationic site may be present at any position in the molecule. The compounds are within the scope of the present invention regardless of the position of the cationic site. For example, Compound (A21) is shown as follows:

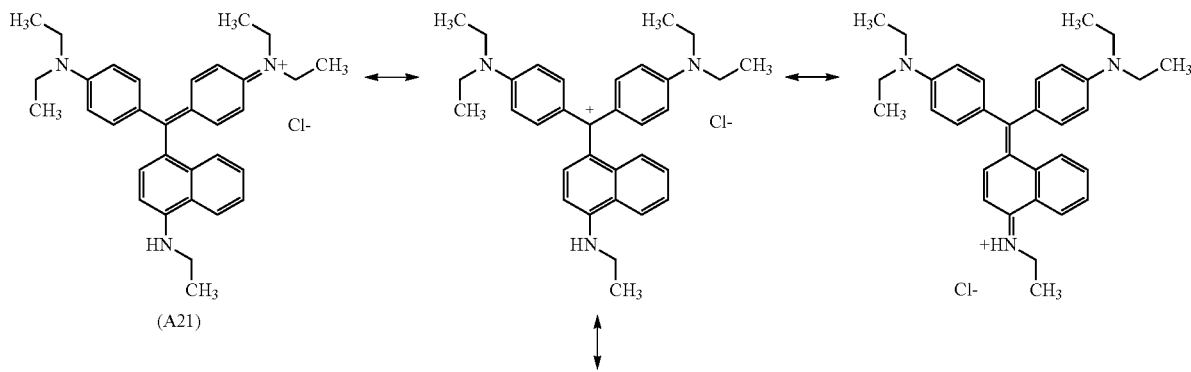

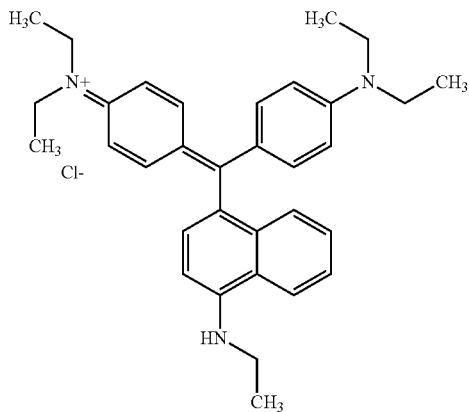

Compounds represented by Formula (2) will now be described.

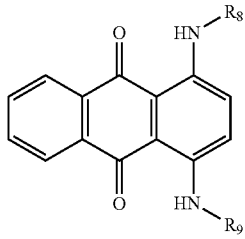
(2)

where, $R_8$ and $R_9$ each independently represent an alkyl group or a substituted or unsubstituted aryl group.

In Formula (2), examples of the alkyl group represented by $R_8$ or $R_9$ include the groups exemplified as the alkyl group represented by $R_1$, $R_2$, $R_3$, or $R_4$ in Formula (1a) and Formula (1b). In particular, when an alkyl group having 1 or 2 carbon atoms, such as a methyl group and an ethyl group, is employed, an image having compatibility between color gamut expansion in the blue direction and process black having a high optical density can be formed.

In Formula (2), examples of the substituted or unsubstituted aryl group represented by $R_8$ or $R_9$ include, but not limited to, a phenyl group and a naphthyl group. In particular, when a phenyl group is employed, an image having compatibility between color gamut expansion in the blue direction and process black having a high optical density can be formed. Examples of the substituent of the substituted aryl group include an alkyl group and an alkoxy group.

Examples of the compound represented by Formula (2) include, but not limited to, Compounds (36) to (41) shown below.

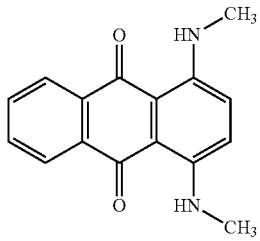
(36)

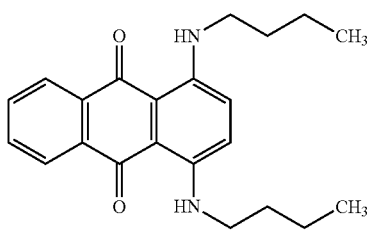
(37)

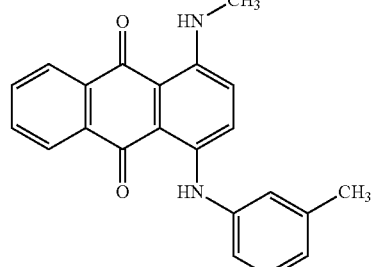
(38)

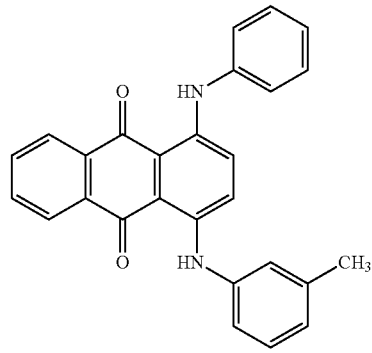
(39)

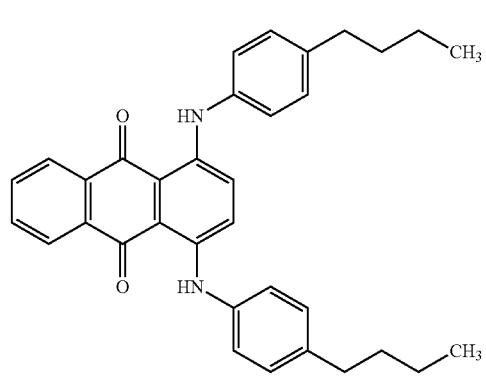
(40)

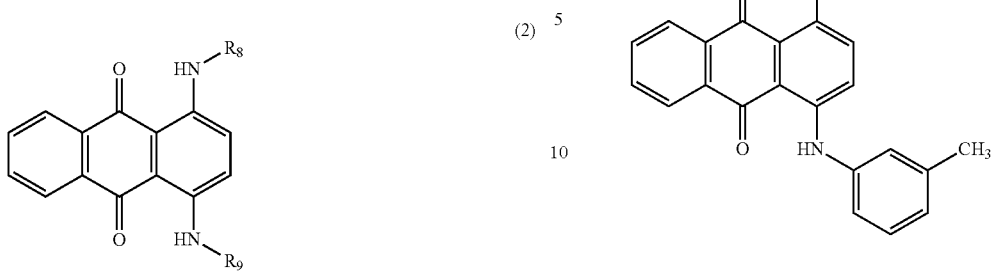
(41)

Among these compounds, the cyan dye can include Compounds (37), (38), or (39), in particular, Compound (38) from the viewpoint of the effects of the present disclosure.

The compound represented by Formula (3) to be included in the cyan dye will now be described.

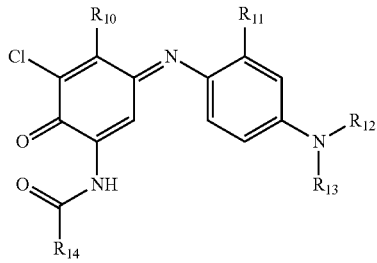
(3)

where, $R_{10}$ to $R_{14}$ each independently represent an alkyl group or a substituted or unsubstituted aryl group.

In Formula (3), examples of the alkyl group represented by any of $R_{10}$ to $R_{14}$ include the groups exemplified as the alkyl group represented by $R_1$, $R_2$, $R_3$, or $R_4$ in Formula (1a) and Formula (1b). In particular, when an alkyl group having 1 or 2 carbon atoms, such as a methyl group and an ethyl group, is employed, an image having compatibility between color gamut expansion in the blue direction and process black having a high optical density can be formed.

In Formula (3), examples of the substituted or unsubstituted aryl group represented by any of $R_{10}$ to $R_{14}$ include, but not limited to, the groups exemplified as the substituted or unsubstituted aryl group represented by $R_8$ or $R_9$ in Formula (2).

Examples of the compound represented by Formula (3) include, but not limited to, Compounds (42) to (47) shown below.

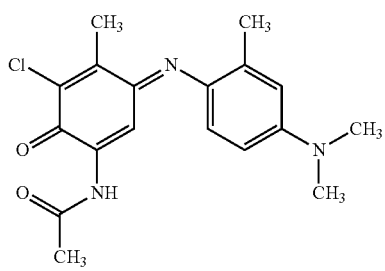
(42)

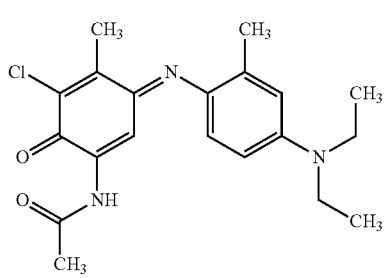
(43)

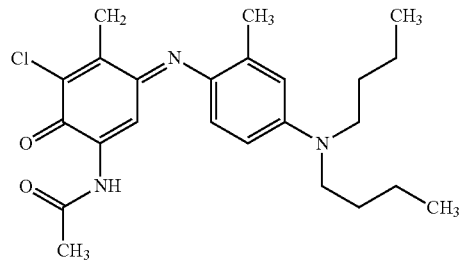
(44)

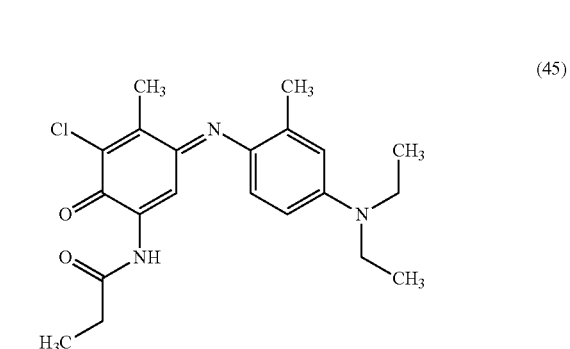
(45)

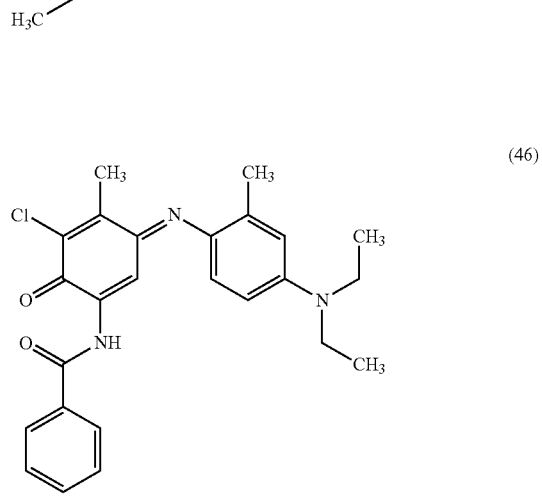
(46)

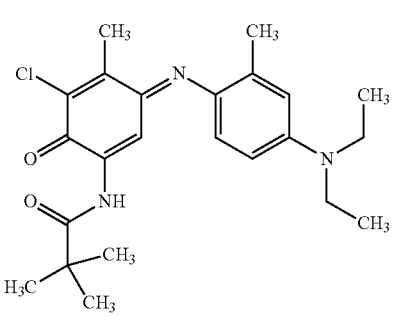
(47)

Among these compounds, the cyan dye can include Compound (42), (43), or (44), in particular, Compound (43) from the viewpoint of the effects of the present disclosure.

The compound represented by Formula (4) included in the cyan dye will now be described.

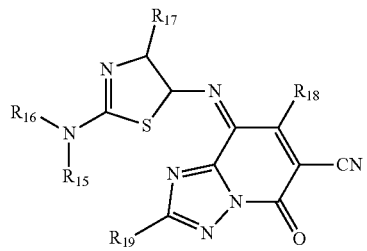
(4)

where, $R_{15}$ to $R_{19}$ each independently represent an alkyl group or a substituted or unsubstituted aryl group.

In Formula (4), examples of the alkyl group represented by any of $R_{15}$ to $R_{19}$ include the groups exemplified as the alkyl group represented by $R_1$, $R_2$, $R_3$, or $R_4$ in Formula (1a) and Formula (1b). In particular, when an alkyl group having 1 or 2 carbon atoms, such as a methyl group and an ethyl group, is employed, an image having compatibility between color gamut expansion in the blue direction and process black having a high optical density can be formed.

In Formula (4), examples of the substituted or unsubstituted aryl group represented by any of $R_{15}$ to $R_{19}$ include the groups exemplified as the substituted or unsubstituted aryl group represented by $R_8$ or $R_9$ in Formula (2).

Examples of the compound represented by Formula (4) include, but not limited to, Compounds (49) to (54) shown below.

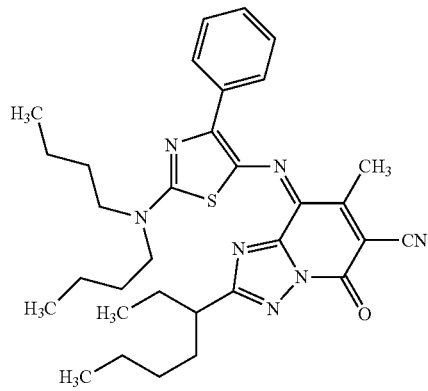
(49)

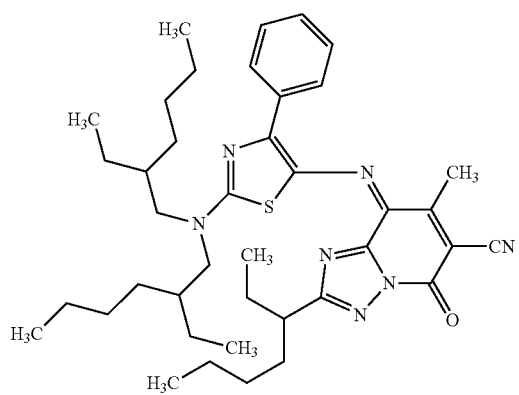
(50)

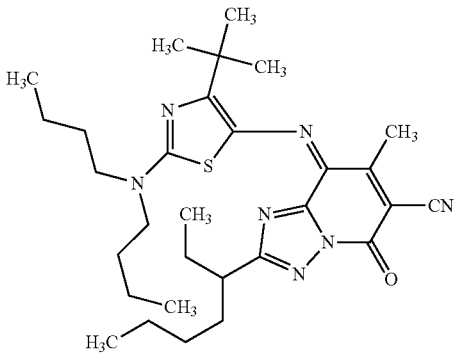
(51)

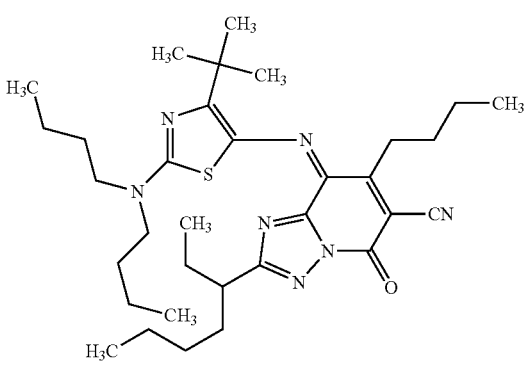
(52)

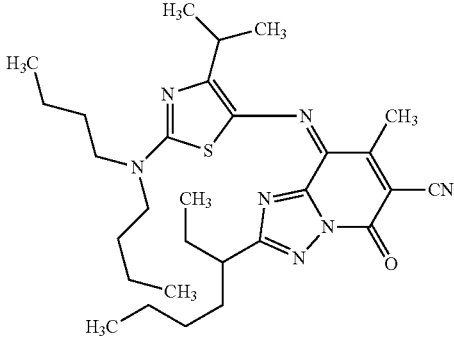
(53)

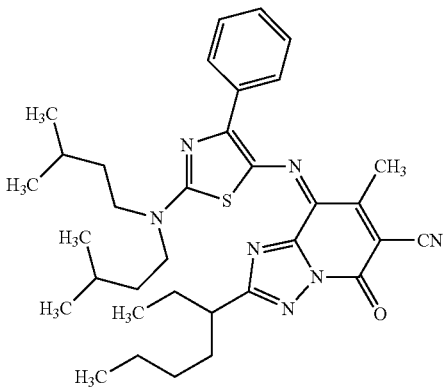
(54)

Among these compounds, the cyan dye can include Compound (49), (50), or (54), in particular, Compound (49) from the viewpoint of the effects of the present disclosure.

Yellow Dye

Yellow dyes represented by Formula (9) will be described.

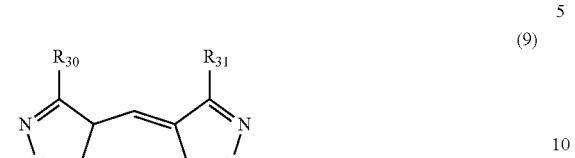
(9)

where, $R_{29}$ to $R_{32}$ each independently represent an alkyl group or a substituted or unsubstituted aryl group.

In Formula (9), examples of the alkyl group represented by any of $R_{29}$ to $R_{32}$ include the groups exemplified as the alkyl group represented by $R_1$, $R_2$, $R_3$, or $R_4$ in Formula (1a) and Formula (1b). In particular, when an alkyl group having 1 or 2 carbon atoms, such as a methyl group and an ethyl group, is employed, an image having compatibility between color gamut expansion in the blue direction and process black having a high optical density can be formed.

In Formula (9), examples of the substituted or unsubstituted aryl group represented by any of $R_{29}$ to $R_{32}$ include the groups exemplified as the substituted or unsubstituted aryl group represented by $R_8$ or $R_9$ in Formula (2).

Examples of the compound represented by Formula (9) include, but not limited to, Compounds (55) to (64) shown below.

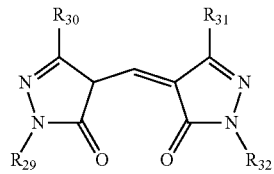
(55)

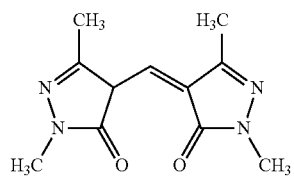
(56)

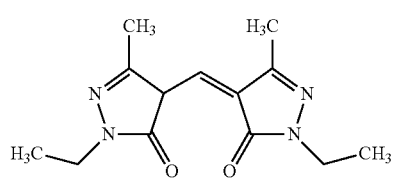
(57)

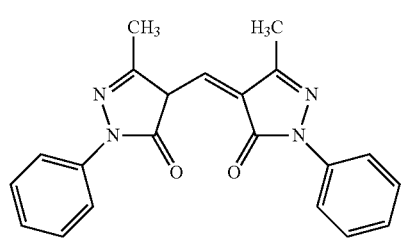
(58)

-continued

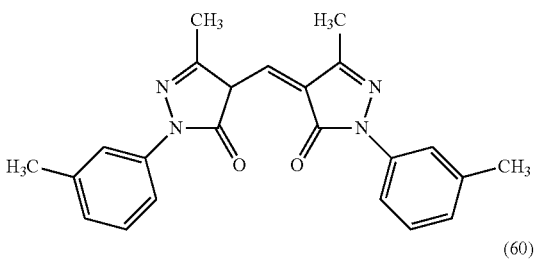
(59)

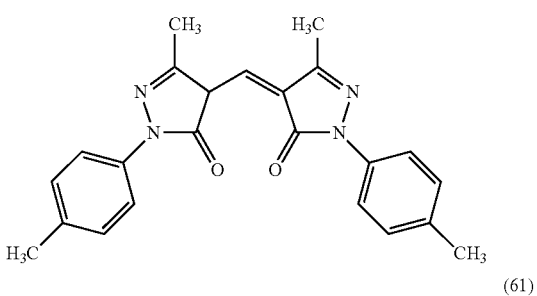
(60)

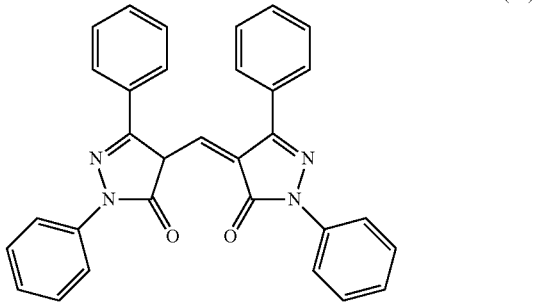
(61)

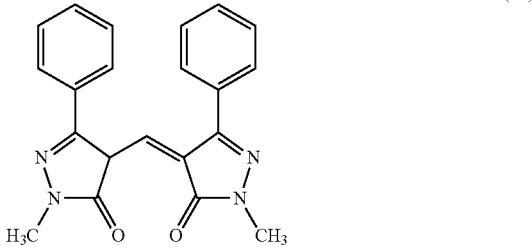
(62)

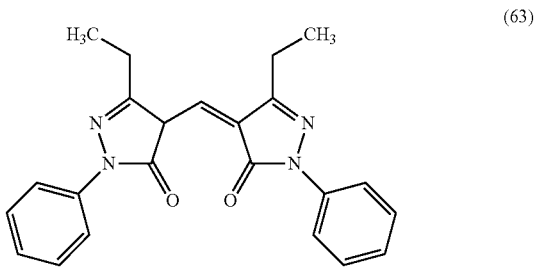
(63)

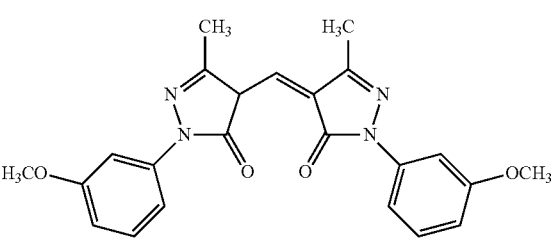
(64)

Among these compounds, the yellow dye can be Compound (57), (58), (59), or (60), in particular, Compound (57) from the viewpoint of the effects of the present disclosure.

Yellow dye represented by Formula (10) will be described.

(10)

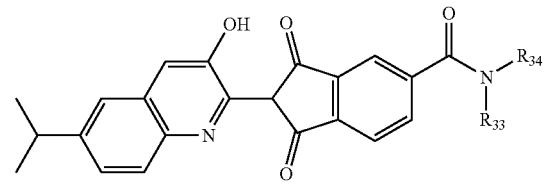

where, $R_{33}$ and $R_{34}$ each independently represent an alkyl group or a substituted or unsubstituted aryl group.

In Formula (10), examples of the alkyl group represented by $R_{33}$ or $R_{34}$ include the groups exemplified as the alkyl group represented by $R_1$, $R_2$, $R_3$, or $R_4$ in Formula (1a) and Formula (1b). In particular, when an alkyl group having 1 or 2 carbon atoms, such as a methyl group and an ethyl group, is employed, an image having compatibility between color gamut expansion in the blue direction and process black having a high optical density can be formed.

In Formula (10), examples of the substituted or unsubstituted aryl group represented by $R_{33}$ or $R_{34}$ include the groups exemplified as the substituted or unsubstituted aryl group represented by $R_8$ or $R_9$ in Formula (2).

Examples of the compound represented by Formula (10) include, but not limited to, Compounds (65) to (73) shown below.

(65)

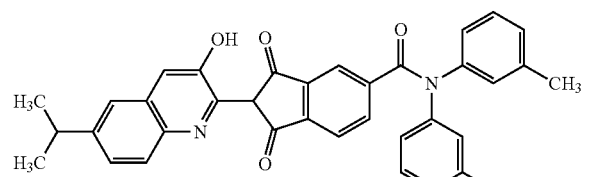

(66)

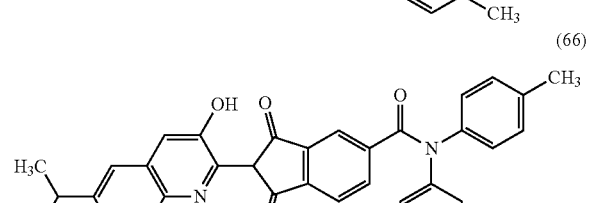

(67)

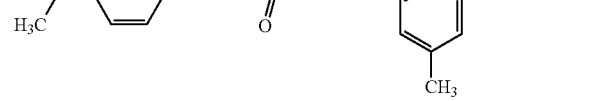

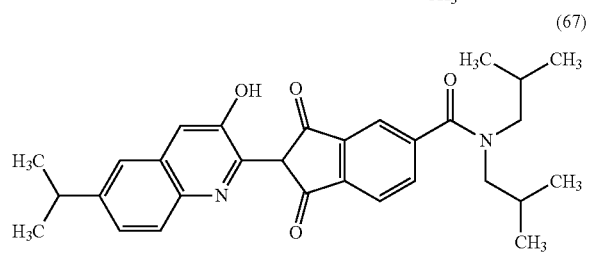

(68)

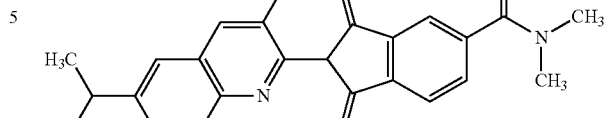

(69)

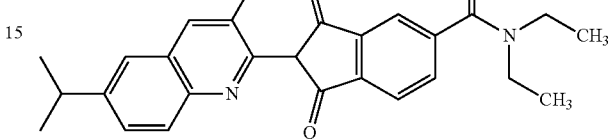

(70)

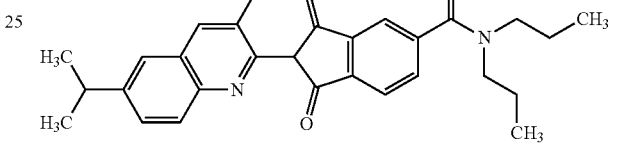

(71)

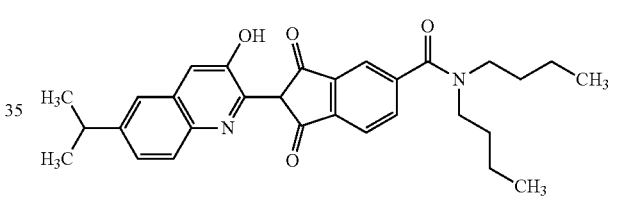

(72)

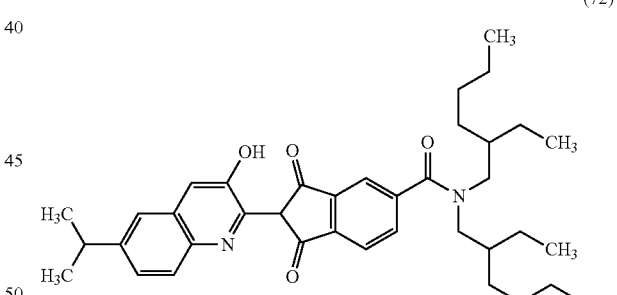

(73)

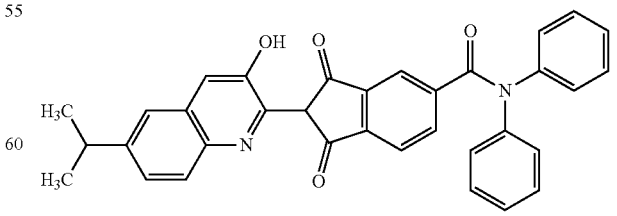

Among these compounds, the yellow dye can be Compound (70), (71), or (72), in particular, Compound (71) from the viewpoint of the effects of the present disclosure.

Yellow dyes represented by Formula (11) will now be described.

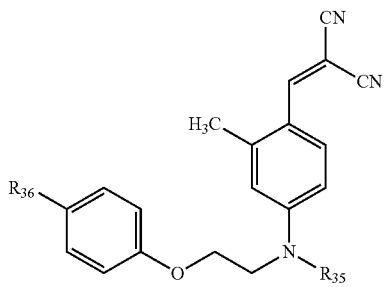
(11)

where, $R_{35}$ and $R_{36}$ each independently represent an alkyl group or a substituted or unsubstituted aryl group.

In Formula (11), examples of the alkyl group represented by $R_{35}$ or $R_{36}$ include the groups exemplified as the alkyl group represented by $R_1$, $R_2$, $R_3$, or $R_4$ in Formula (1a) and Formula (1b). In particular, when an alkyl group having 1 or 2 carbon atoms, such as a methyl group and an ethyl group, is employed, an image having compatibility between color gamut expansion in the blue direction and process black having a high optical density can be formed.

In Formula (11), examples of the substituted or unsubstituted aryl group represented by $R_{35}$ or $R_{36}$ include the groups exemplified as the substituted or unsubstituted aryl group represented by $R_8$ or $R_9$ in Formula (2).

Examples of the compound represented by Formula (11) include, but not limited to, Compounds (74) to (78) shown below.

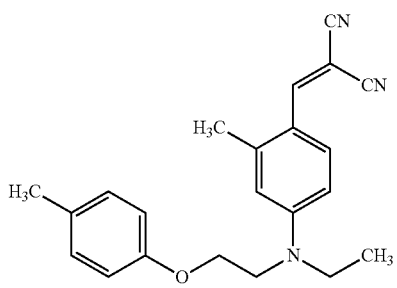
(74)

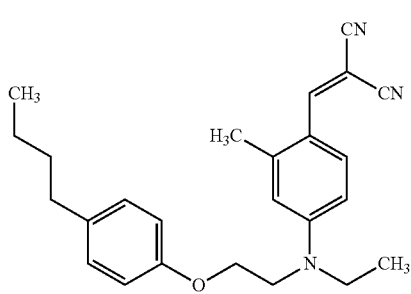
(75)

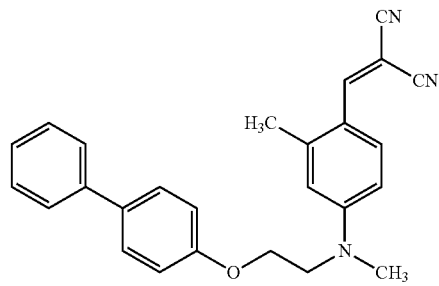
(76)

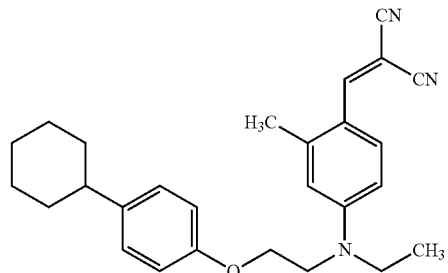
(77)

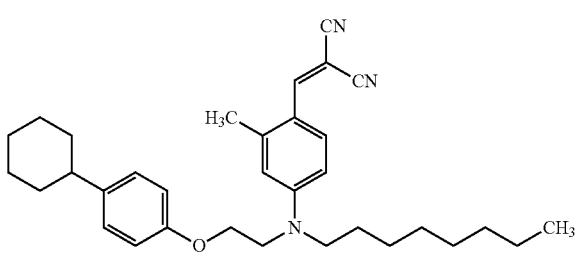
(78)

Among these compounds, the yellow dye can be Compound (77) or (78), in particular, Compound (77) from the viewpoint of the effects of the present disclosure.

Yellow dyes represented by Formula (12) will now be described.

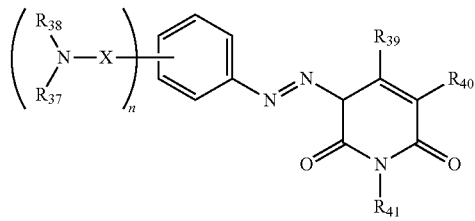
(12)

where, $R_{37}$ represents an alkyl group; $R_{38}$ represents a hydrogen atom or an alkyl group; $R_{39}$ represents an alkyl group, a substituted or unsubstituted aryl group, or an amino group; $R_{40}$ represents a hydrogen atom, a cyano group, a carbamoyl group, an alkoxycarbonyl group, or a carboxylic acid amide group; $R_{41}$ represents a hydrogen atom, an alkyl group, a substituted or unsubstituted aryl group, or —N(—$R_{42}$)$R_{43}$ where $R_{42}$ and $R_{43}$ each independently represent a hydrogen atom, an alkyl group, or an acyl group, and $R_{42}$ and $R_{43}$ may be bonded to each other to form a ring; X represents a carbonyl group or a sulfonyl group; and n represents an integer of 1 to 3.

In Formula (12), examples of the alkyl group represented by $R_{37}$ or $R_{38}$ include the groups exemplified as the alkyl group represented by $R_1$, $R_2$, $R_3$, or $R_4$ in Formula (1a) and Formula (1b). In particular, the alkyl can be an n-butyl group or a 2-ethylhexyl group.

In Formula (12), examples of the alkyl group represented by $R_{39}$ include, but not limited to, a methyl group, an ethyl group, a propyl group, and a butyl group.

In Formula (12), examples of the substituted or unsubstituted aryl group represented by $R_{39}$ or $R_{41}$ include, but not limited to, a phenyl group. Examples of the substituent of the substituted aryl group include a methyl group.

In Formula (12), examples of the amino group represented by $R_{39}$ include, but not limited to, an amino group and a dimethylamino group.

Among these compounds, from the viewpoint of the effects of the present disclosure, $R_{39}$ can be an alkyl group, in particular, a methyl group.

In Formula (12), examples of the alkoxycarbonyl group represented by $R_{40}$ include, but not limited to, a methoxycarbonyl group (methyl carboxylate group) and ethoxycarbonyl group (ethyl carboxylate group).

In Formula (12), examples of the carboxylic acid amide group represented by $R_{40}$ include carboxylic acid dialkylamide groups, such as a carboxylic acid dimethyl amide group and a carboxylic acid diethylamide group; and carboxylic acid monoalkylamide groups, such as a carboxylic acid methylamide group and a carboxylic acid ethylamide group.

Among these compounds, from the viewpoint of the effects of the present disclosure, $R_{40}$ can be a cyano group.

In Formula (12), examples of the alkyl group represented by $R_{41}$, $R_{42}$, or $R_{43}$ include the groups exemplified as the alkyl group represented by $R_1$, $R_2$, $R_3$, or $R_4$ in Formula (1a) and Formula (1b). In particular, the alkyl can be an ethyl group or an n-propyl group.

In Formula (12), examples of the acyl group represented by $R_{42}$ or $R_{43}$ include, but not limited to, an acetyl group, an ethylhexanoyl group, and a benzoyl group.

In particular, from the viewpoint of the effects of the present disclosure, at least one of $R_{13}$ and $R_{14}$ can be an alkyl group, in particular, a methyl group.

In Formula (12), the ring formed by $R_{42}$ and $R_{43}$ bonded to each other may be any ring that does not affect the expression of process black having high saturation, broad color gamut reproducibility, and a high optical density, and examples thereof include, but not limited to, a pyrrolidine ring, a piperidine ring, an azepane ring, and an azocane ring.

In Formula (12), X can be a carbonyl group from the viewpoint of the effects of the present disclosure.

In Formula (12), n represents an integer of 1 to 3, and from the viewpoint of the effects of the present disclosure, n can be 1.

Although Formula (12) shows only an azo-form, its tautomer, hydrazo-form, is also within the scope of the present invention.

The compound represented by Formula (12) can be synthesized with reference to a known method described in International Patent Application No. WO 08/114886.

Examples of the compound represented by Formula (12) include, but not limited to, Compounds (79) to (90) shown below.

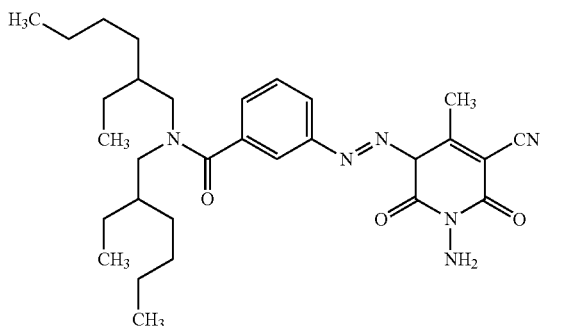

(79)

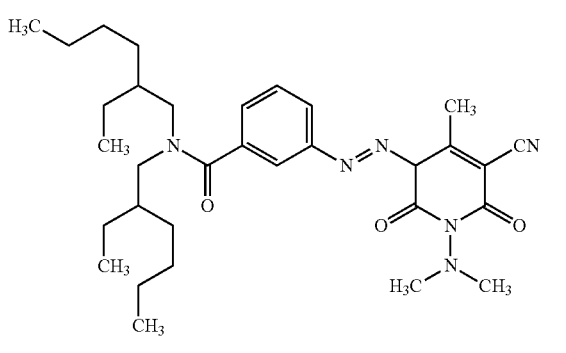

(80)

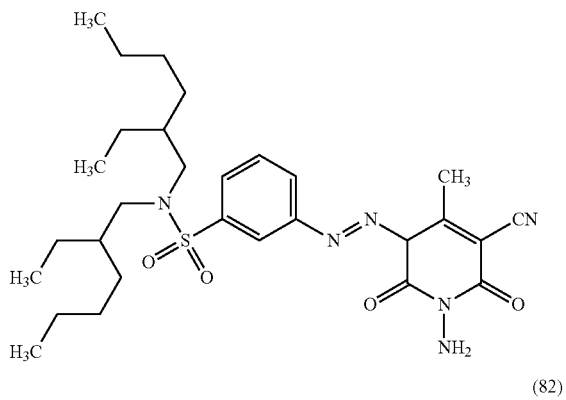

(81)

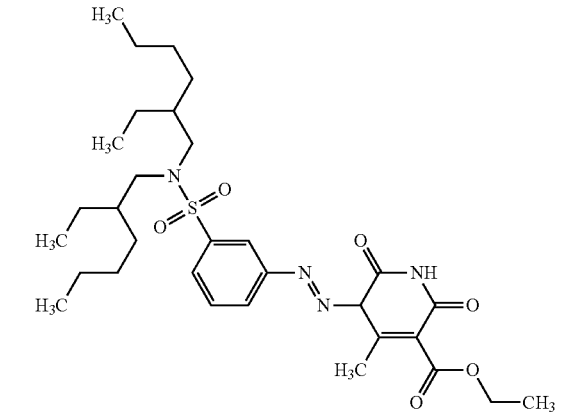

(82)

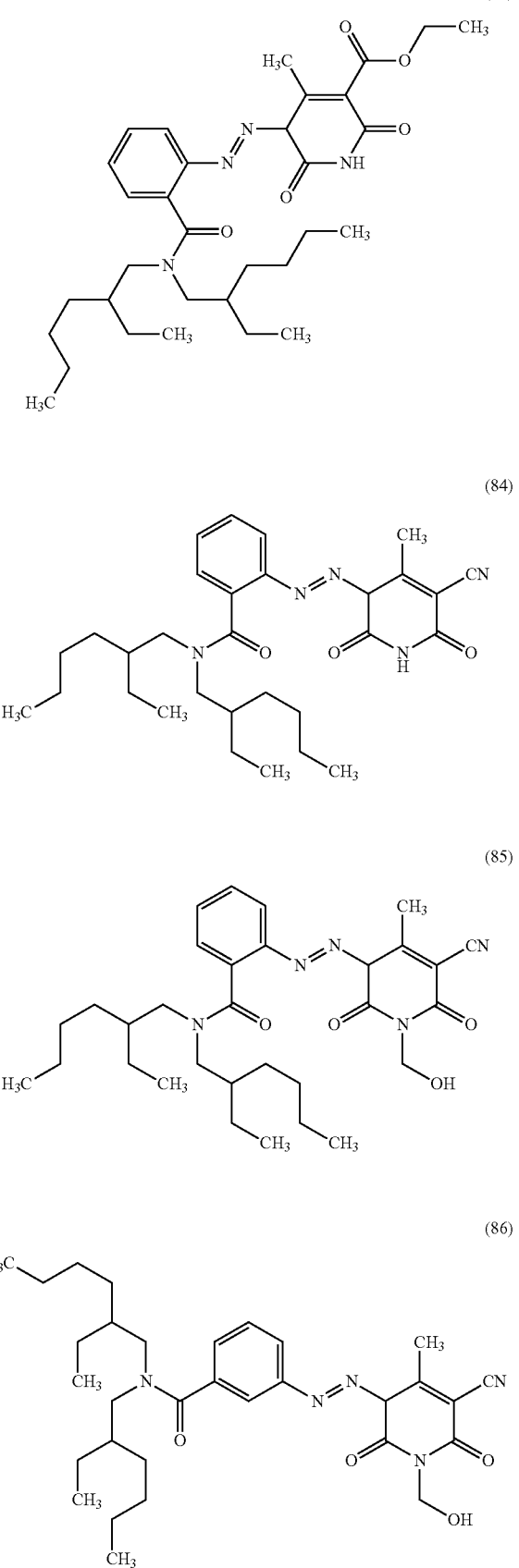
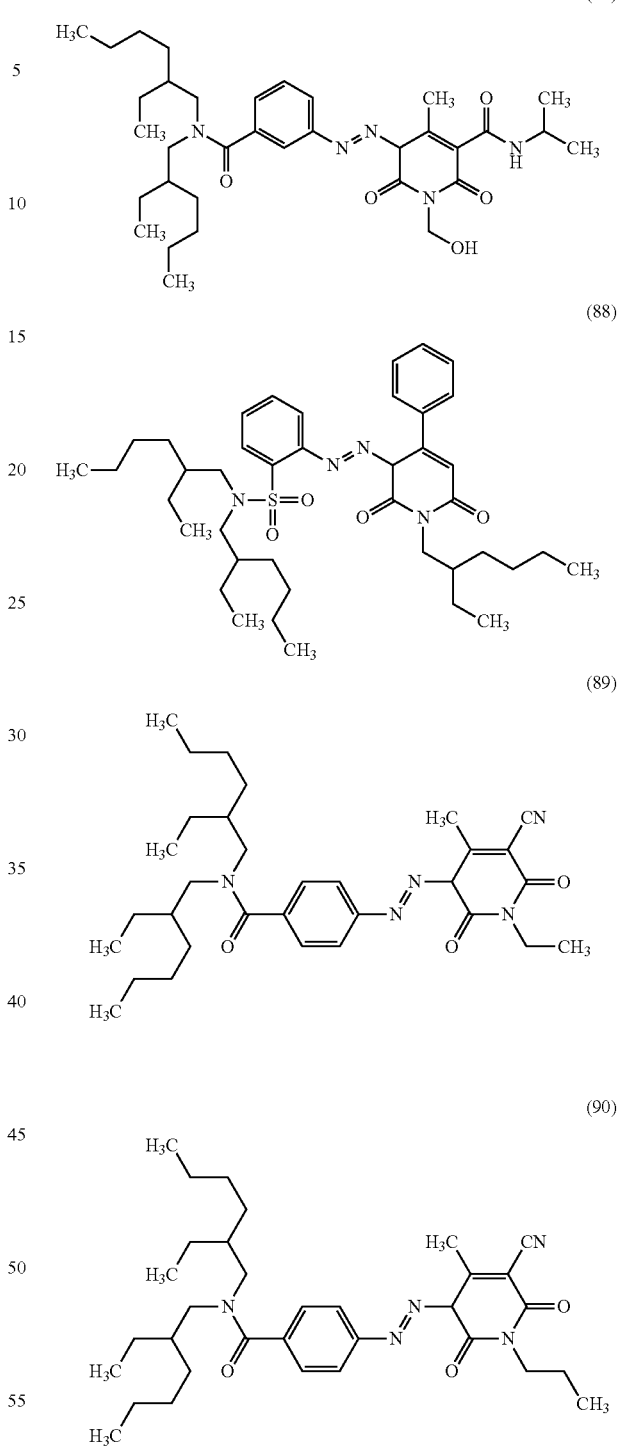
Among these compounds, the yellow dye can be Compound (79), (80), (85), (86), (89), or (90), in particular, from the viewpoint of the effects of the present disclosure, Compound (85), (86), (89), or (90).
In addition, for toning the color, a known yellow dye may be added to the yellow dye. The known yellow dye is, for example, Compound (91) or (92) shown below, but is not limited thereto.

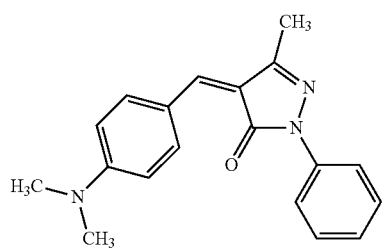
(91)

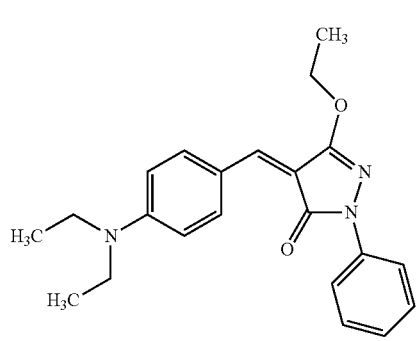
(92)

Magenta Dye

Magenta dyes represented by Formula (13) will now be described.

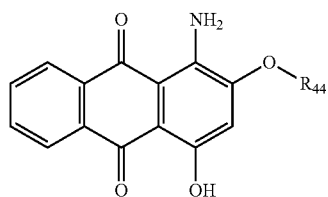
(13)

where, $R_{44}$ represents an alkyl group, a substituted or unsubstituted aryl group, or —($R_{45}$—O)n-$R_{46}$ where $R_{45}$ represents an alkylene group, $R_{46}$ alkyl group, and n is 1 or 2.

In Formula (13), examples of the alkyl group represented by $R_{44}$ include the groups exemplified as the alkyl group represented by $R_1$, $R_2$, $R_3$, or $R_4$ in Formula (1a) and Formula (1b). In particular, from the viewpoint of the effects of the present disclosure, the alkyl group can be an alkyl group having 1 or 2 carbon atoms, such as a methyl group and an ethyl group.

In Formula (13), examples of the substituted or unsubstituted aryl group represented by $R_{44}$ include the groups exemplified as the substituted or unsubstituted aryl group represented by $R_8$ or $R_9$ in Formula (2).

In Formula (13), —($R_{45}$—O)n-$R_{46}$ represented by $R_{44}$ can have, but not limited to, 20 or less carbon atoms in total.

Examples of the compound represented by Formula (13) include, but not limited to, Compounds (93) to (101) shown below.

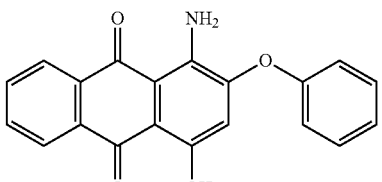
(93)

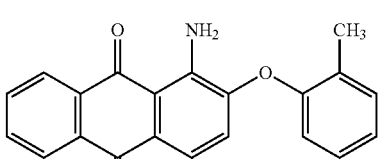
(94)

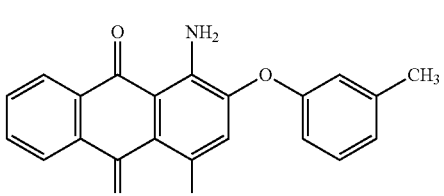
(95)

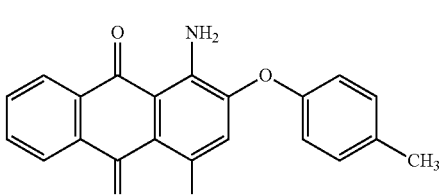
(96)

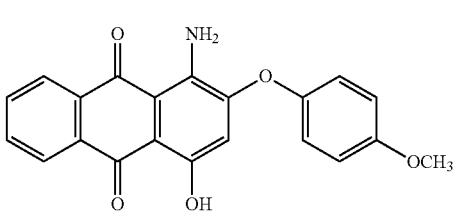
(97)

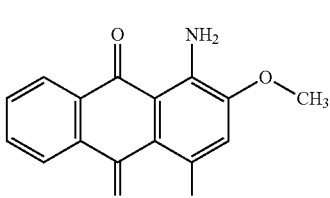
(98)

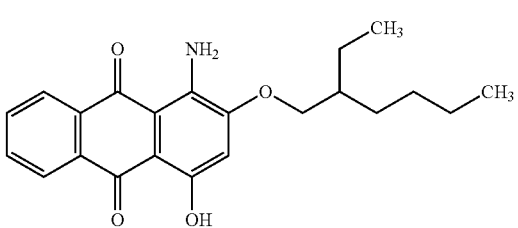
(99)

-continued

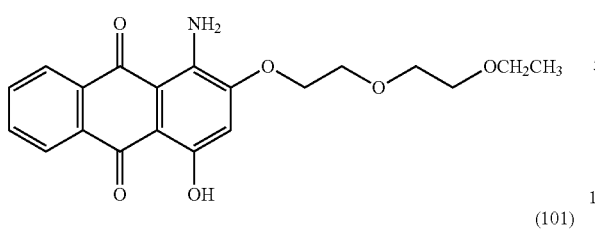
(100)

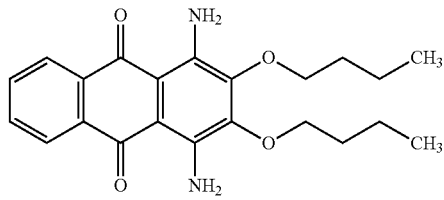
(103)

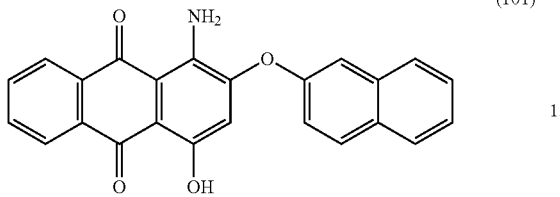
(101)

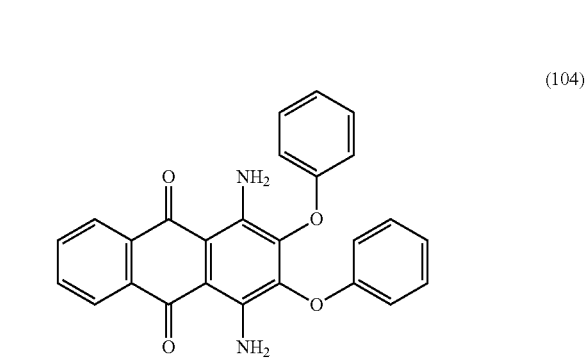
(104)

Among these compounds, the magenta dye can be Compound (93), (94), (95), (96), or (97), in particular, from the viewpoint of the effects of the present disclosure, Compound (93) or (95).

Magenta dyes represented by Formula (14) will now be described.

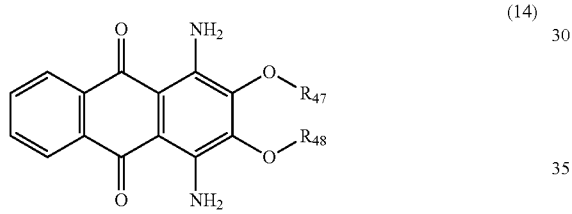
(14)

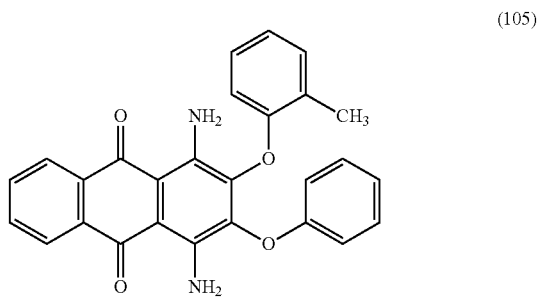
(105)

where, $R_{47}$ and $R_{48}$ each independently represent an alkyl group or a substituted or unsubstituted aryl group.

In Formula (14), examples of the alkyl group represented by $R_{47}$ or $R_{48}$ include the groups exemplified as the alkyl group represented by $R_1$, $R_2$, $R_3$, or $R_4$ in Formula (1a) and Formula (1b). In particular, from the viewpoint of the effects of the present disclosure, the alkyl group can be an alkyl group having 1 or 2 carbon atoms, such as a methyl group and an ethyl group.

In Formula (14), examples of the substituted or unsubstituted aryl group represented by $R_{47}$ or $R_{48}$ include the groups exemplified as the substituted or unsubstituted aryl group represented by $R_8$ or $R_9$ in Formula (2).

Examples of the compound represented by Formula (14) include, but not limited to, Compounds (102) to (110) shown below.

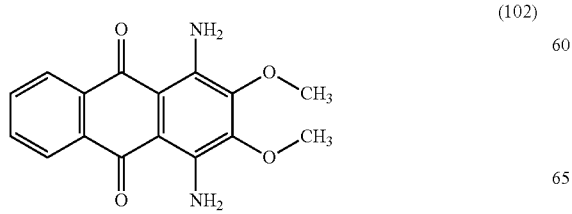
(102)

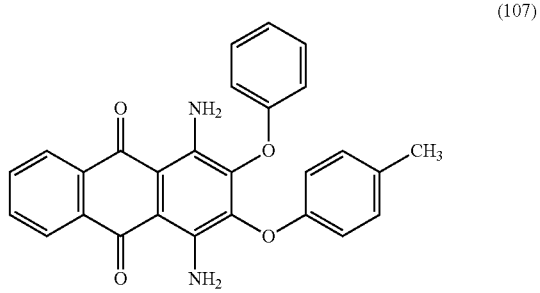
(106)

(107)

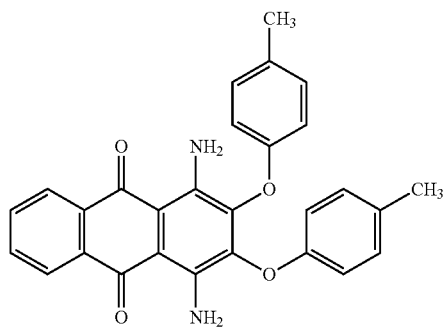

(108)

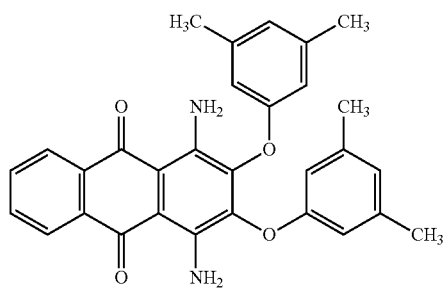

(109)

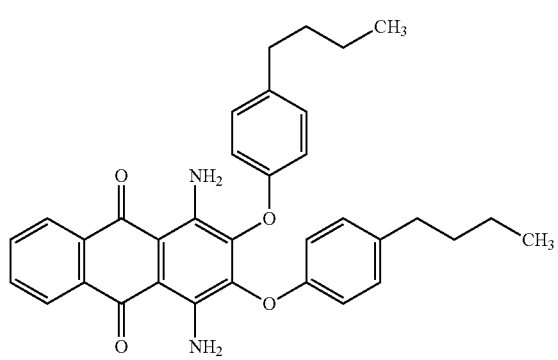

(110)

Among these compounds, the magenta dye can be Compound (104), (105), (106), (107), (108), or (109), in particular, from the viewpoint of the effects of the present disclosure, Compound (104), (108), or (109).

Magenta dyes represented by Formula (15) will now be described.

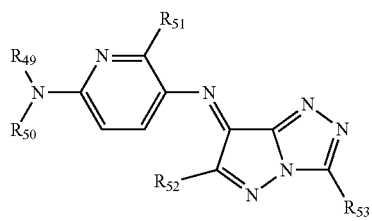

(15)

where, $R_{49}$ to $R_{53}$ each independently represent an alkyl group or a substituted or unsubstituted aryl group.

In Formula (15), examples of the alkyl group represented by any of $R_{49}$ to $R_{53}$ include the groups exemplified as the alkyl group represented by $R_1$, $R_2$, $R_3$, or $R_4$ in Formula (1a) and Formula (1b). In particular, from the viewpoint of the effects of the present disclosure, the alkyl group can be an alkyl group having 1 or 2 carbon atoms, such as a methyl group and an ethyl group.

In Formula (15), examples of the substituted or unsubstituted aryl group represented by any of $R_{49}$ to $R_{53}$ include the groups exemplified as the substituted or unsubstituted aryl group represented by $R_8$ or $R_9$ in Formula (2).

Examples of the compound represented by Formula (15) include, but not limited to, Compounds (111) to (119) shown below.

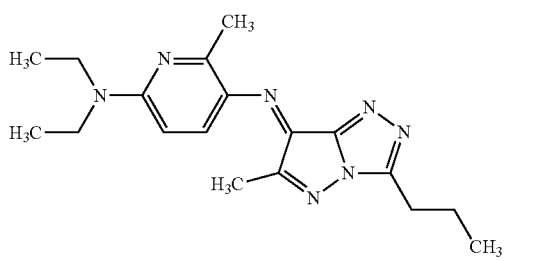

(111)

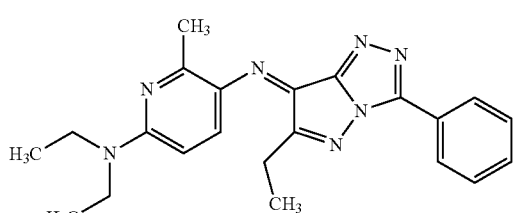

(112)

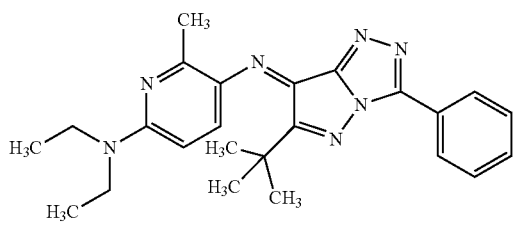

(113)

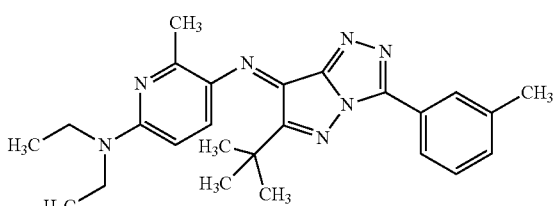

(114)

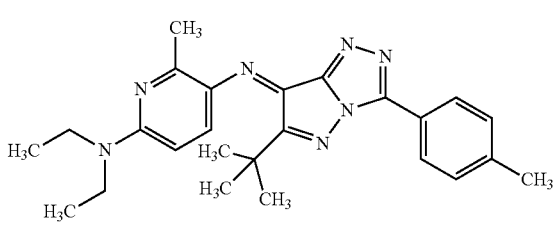

(115)

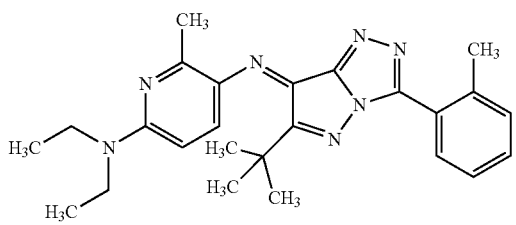
(116)

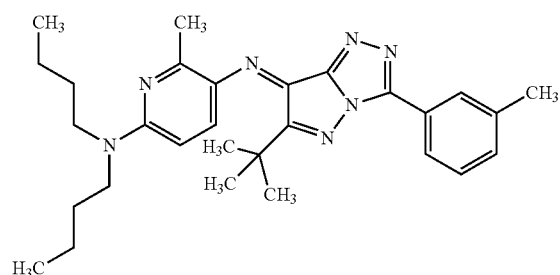
(117)

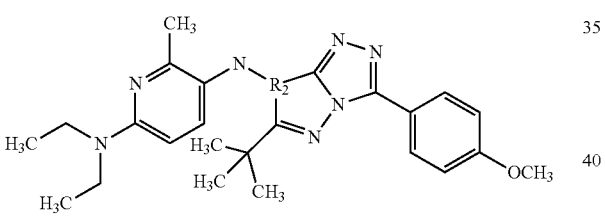
(118)

(119)

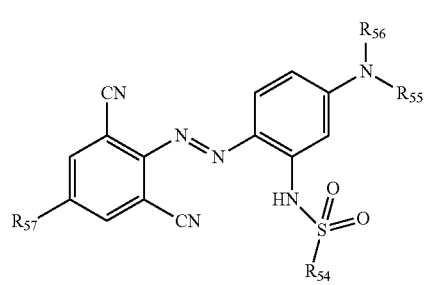

Among these compounds, the magenta dye can be Compound (113), (114), (115), (116), or (117), in particular, from the viewpoint of the effects of the present disclosure, Compound (114), (115), or (116).

Magenta dyes represented by Formula (16) will now be described.

(16)

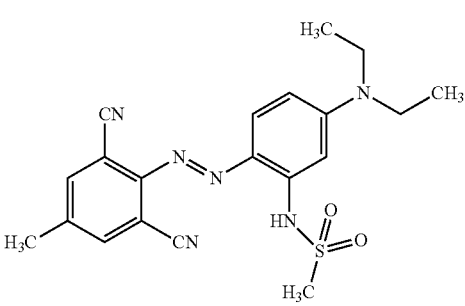

where, $R_{54}$ to $R_{57}$ each independently represent an alkyl group or a substituted or unsubstituted aryl group.

In Formula (16), examples of the alkyl group represented by any of $R_{54}$ to $R_{57}$ include the groups exemplified as the alkyl group represented by $R_1$, $R_2$, $R_3$, or $R_4$ in Formula (1a) and Formula (1b). In particular, from the viewpoint of the effects of the present disclosure, the alkyl group can be an alkyl group having 1 or 2 carbon atoms, such as a methyl group and an ethyl group.

In Formula (16), examples of the substituted or unsubstituted aryl group represented by any of $R_{54}$ to $R_{57}$ include the groups exemplified as the substituted or unsubstituted aryl group represented by $R_8$ or $R_9$ in Formula (2).

Examples of the compound represented by Formula (16) include, but not limited to, Compounds (120) to (128) shown below.

(120)

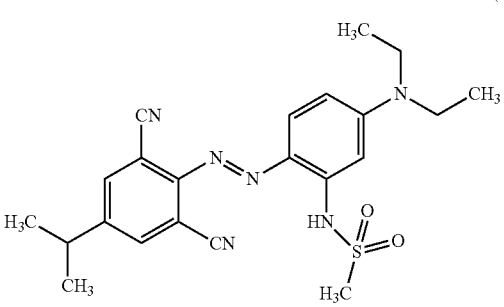

(121)

(122)

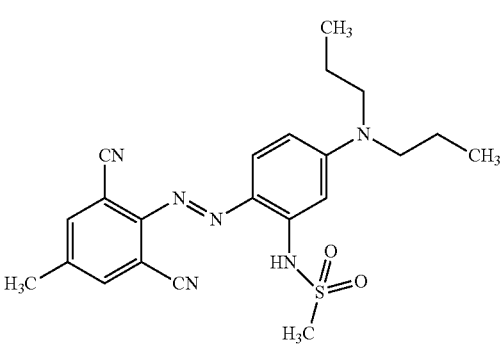

-continued (123)
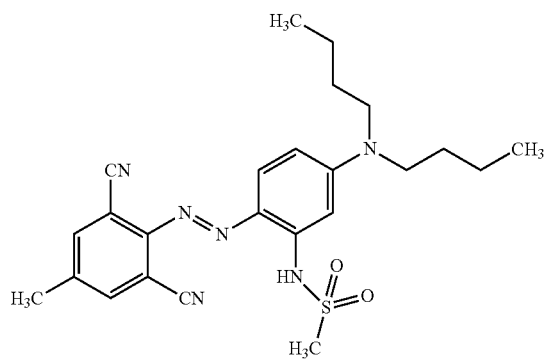

(124)
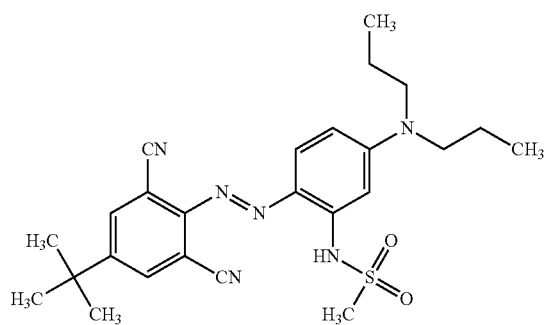

(125)
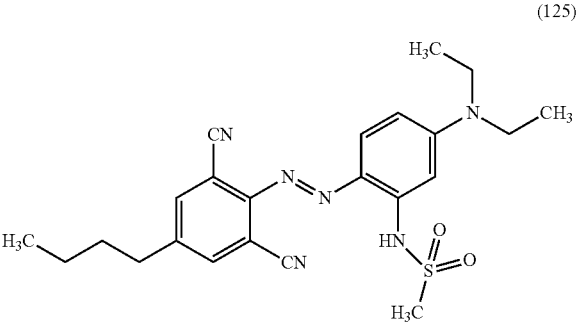

(126)
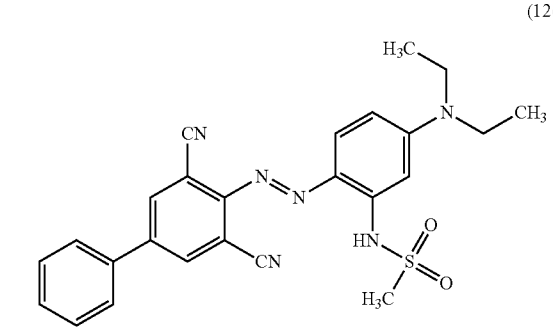

-continued (127)
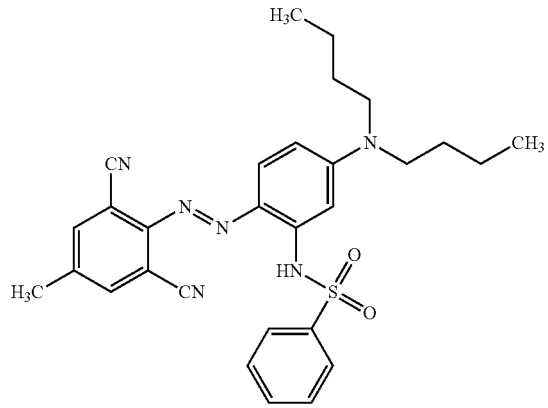

(128)
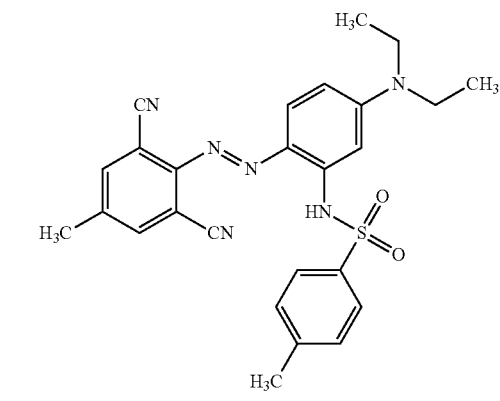

Among these compounds, the magenta dye can be Compound (120), (122), (123), or (124), in particular, from the viewpoint of the effects of the present disclosure, Compound (122).

Magenta dyes represented by Formula (17) will now be described.

(17)
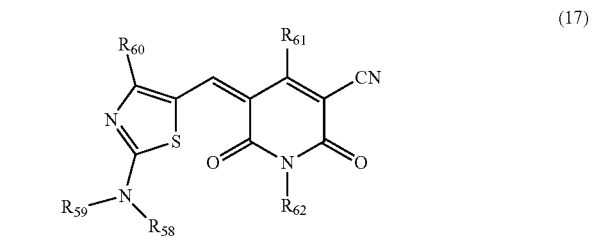

where, $R_{58}$ and $R_{59}$ each independently represent an alkyl group; $R_{60}$ represents a hydrogen atom, an alkyl group, or a substituted or unsubstituted aryl group; $R_{61}$ represents an alkyl group or a substituted or unsubstituted aryl group; $R_{62}$ represents a hydrogen atom, an alkyl group, a substituted or unsubstituted aryl group, or —N(—$R_{63}$)$R_{64}$ where $R_{63}$ and $R_{64}$ each independently represent a hydrogen atom, an alkyl group, an aryl group, or an acyl group, and $R_{63}$ and $R_{64}$ may be bonded to each other to form a ring.

In Formula (17), examples of the alkyl group represented by $R_{58}$ or $R_{59}$ include the groups exemplified as the alkyl group represented by $R_1$, $R_2$, $R_3$, or $R_4$ in Formula (1a) and Formula (1b). In particular, from the viewpoint of the effects of the present disclosure, the alkyl group can be a branched alkyl group, such as a 2-ethylhexyl group.

In Formula (17), examples of the alkyl group represented by $R_{60}$ include the groups exemplified as the alkyl group represented by $R_1$, $R_2$, $R_3$, or $R_4$ in Formula (1a) and Formula (1b). In particular, from the viewpoint of the effects of the present disclosure, the alkyl group can be a tert-butyl group.

In Formula (17), examples of the substituted or unsubstituted aryl group represented by $R_{60}$ include, but not limited to, a phenyl group. Examples of the substituent of the substituted aryl group include a methyl group, an ethyl group, and a methoxy group. Examples of the substituted aryl group include a 2-methylphenyl group, a 3-methylphenyl group, a 4-methylphenyl group, a 2,6-dimethylphenyl group, a 2,6-diethylphenyl group, a 2,6-dimethoxyphenyl group, a 2,4,6-trimethylphenyl group, a 2,4,6-triethylphenyl group, and a 3-methoxyphenyl group.

$R_{60}$ can be a phenyl group or a tert-butyl group, in particular, from the viewpoint of the effects of the present disclosure, a tert-butyl group.

In Formula (17), examples of the alkyl group represented by $R_{61}$ include, but not limited to, alkyl groups having 1 to 4 carbon atoms, such as a methyl group, an ethyl group, an n-propyl group, an iso-propyl group, an n-butyl group, an iso-butyl group, a 2-methylbutyl group, and a 2,3,3-trimethylbutyl group. In particular, from the viewpoint of the effects of the present disclosure, the alkyl group can be a methyl group.

In Formula (17), examples of the substituted or unsubstituted aryl group represented by $R_{61}$ include, but not limited to, a phenyl group. Examples of the substituent of the substituted aryl group include a methyl group and a methoxy group. Examples of the substituted aryl group include a 2-methylphenyl group, a 3-methylphenyl group, a 4-methylphenyl group, a 4-methoxyphenyl group, and a 3,5-dimethylphenyl group.

In Formula (17), examples of the alkyl group represented by $R_{62}$ include, but not limited to, a methyl group, an ethyl group, an n-propyl group, an iso-propyl group, an n-butyl group, and an iso-butyl group. In particular, from the viewpoint of the effects of the present disclosure, the alkyl group can be a methyl group.

In Formula (17), examples of the aryl group represented by $R_{62}$ include, but not limited to, a substituted or unsubstituted phenyl group.

In Formula (17), when $R_{62}$ is $-N(-R_{63})R_{64}$, examples of the alkyl group represented by $R_{63}$ or $R_{64}$ include the groups exemplified as the alkyl group represented by $R_1$, $R_2$, $R_3$, or $R_4$ in Formula (1a) and Formula (1b). In particular, from the viewpoint of the effects of the present disclosure, the alkyl group can be a methyl group.

Examples of the acyl group represented by $R_{63}$ or $R_{64}$ include, but not limited to, a substituted or unsubstituted alkylcarbonyl group having 2 to 30 carbon atoms and a substituted or unsubstituted arylcarbonyl group having 7 to 30 carbon atoms, such as an acetyl group, a propionyl group, a pivaloyl group, a benzoyl group, and a naphthoyl group.

Examples of the ring formed by $R_{63}$ and $R_{64}$ bonded to each other include, but not limited to, a piperidine ring, a piperazine ring, and a morpholine ring.

In particular, when at least one of $R_{63}$ and $R_{64}$ is an alkyl group, high light resistance can be provided. In particular, from the viewpoint of the effects of the present disclosure, the alkyl group can be a methyl group.

The compounds represented by Formula (17) exist as cis-trans geometric isomers, and both isomers are within the scope of the present invention.

Examples of the compound represented by Formula (17) include, but not limited to, Compounds (129) to (139) shown below.

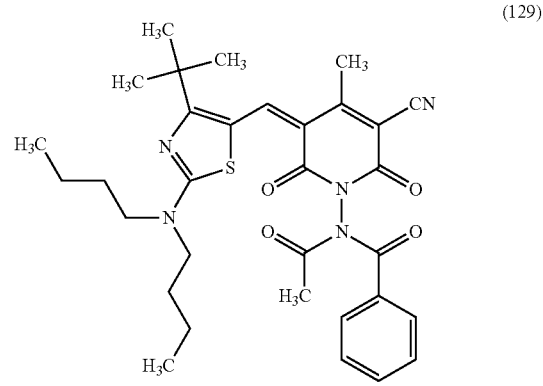

(129)

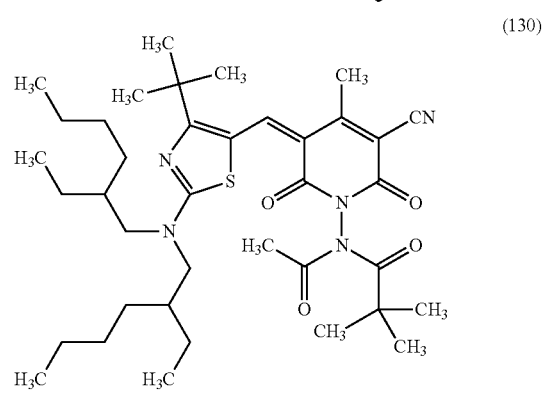

(130)

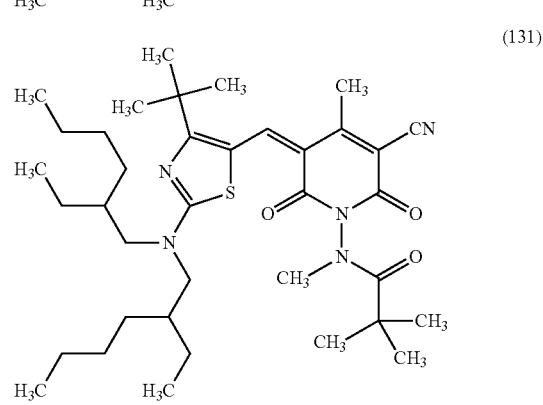

(131)

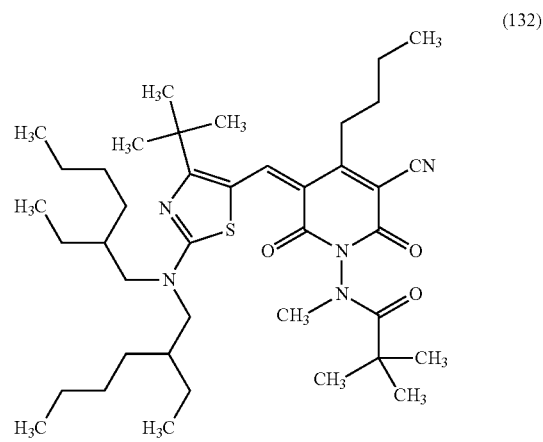

(132)

(133)
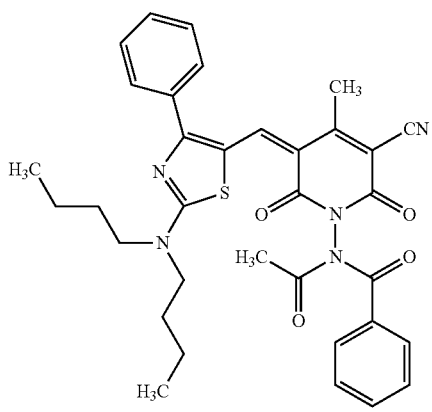
(134)
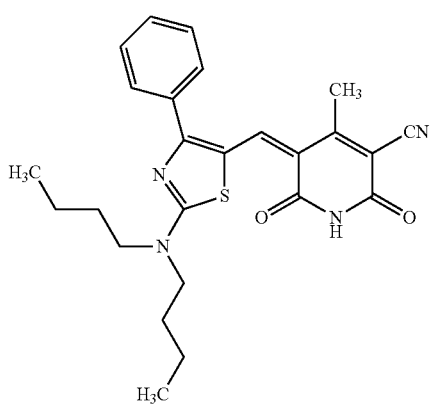
(135)
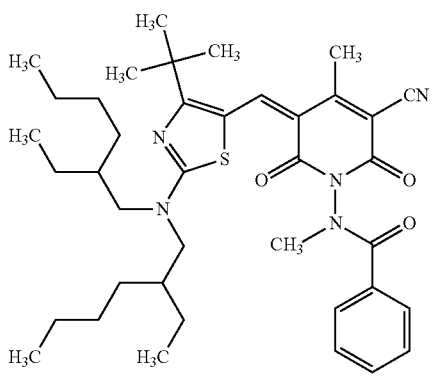
(136)
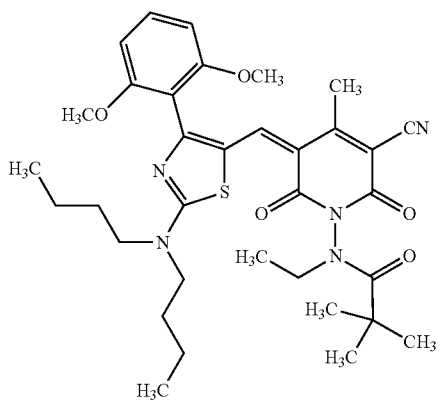
(137)
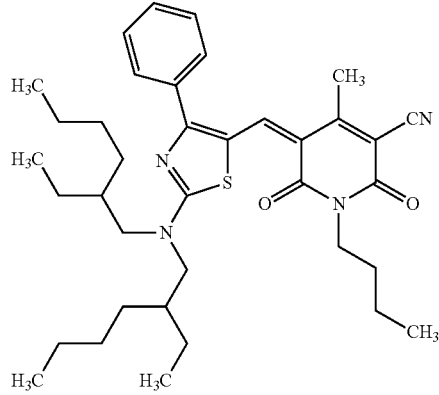
(138)
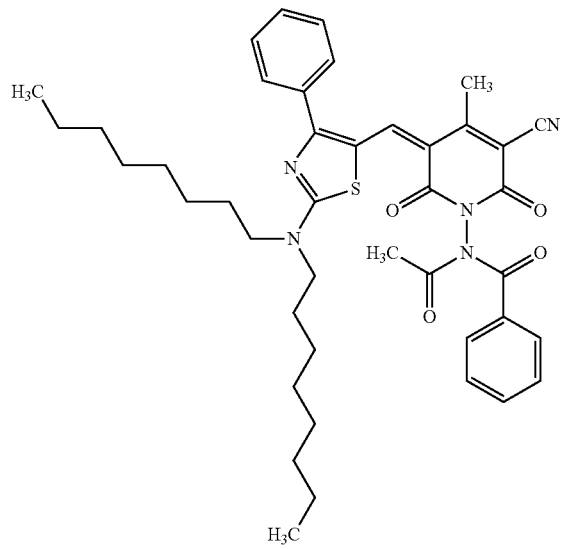
(139)
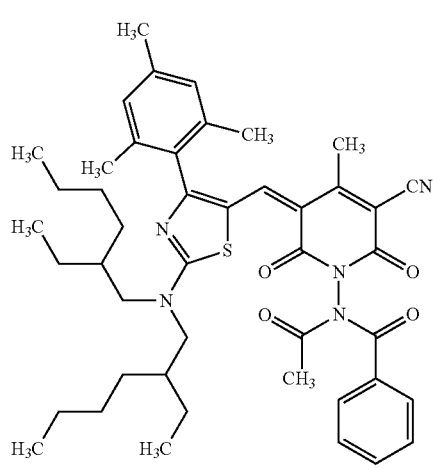
Among these compounds, the magenta dye can be Compound (129), (131), (133), (135), or (138), in particular, from the viewpoint of the effects of the present disclosure, Compound (129), (131), or (135).
Thermal Transfer Recording Sheet
The thermal transfer recording sheet of the present disclosure includes a base material and a colorant layer on the base material. The colorant layer includes a yellow dye layer containing a yellow dye, a magenta dye layer containing a magenta dye, and a cyan dye layer containing a cyan dye.

A structure of the thermal transfer recording sheet will now be described.

Base Material

The base material constituting the thermal transfer recording sheet supports a colorant layer described below and can be a known base material. The known base material may be any material having certain degrees of heat resistance and strength, and examples thereof include a polyethylene terephthalate film, a polyethylene naphthalate film, a polycarbonate film, a polyimide film, a polyamide film, an aramide film, a polystyrene film, a poly(1,4-polycyclohexylene dimethylene terephthalate) film, a polysulfone film, a polypropylene film, a polyphenylene sulfide film, a polyvinyl alcohol film, cellophane, a cellulose derivative, a polyethylene film, a polyvinyl chloride film, a nylon film, condenser paper, and paraffin film. In particular, the base material can be a polyethylene terephthalate film from the viewpoint of its high mechanical strength, solvent resistance, and economical efficiency.

The base material can have a thickness of 0.5 to 50 μm, in particular, 3 to 10 μm, from the viewpoint of transferability.

One or both surfaces of the base material can be optionally subjected to adhesive treatment. When an ink containing a dye is applied onto the base material for forming a colorant layer, for example, wettability and adhesiveness of the coating solution are apt to be insufficient. In such a case, the adhesive treatment should be performed.

Examples of the adhesive treatment include ozone treatment, corona discharge treatment, UV light treatment, plasma treatment, low-temperature plasma treatment, primer treatment, and chemical agent treatment. These treatments may be performed in combination of two or more thereof.

In order to enhance the adhesiveness between the base material and the colorant layer, an adhesive layer may be applied onto the base material.

The adhesive layer may be made of, for example, an organic material, such as polyester, polystyrene, polyacrylic ester, polyamide, polyether, polyvinyl acetate, polyethylene, polypropylene, polyvinyl chloride, polyvinyl alcohol, and polyvinyl butyral; and inorganic microparticles, such as silica, alumina, magnesium carbonate, magnesium oxide, and titanium oxide.

Colorant Layer

The thermal transfer recording sheet includes a yellow dye layer, a magenta dye layer, and a cyan dye layer as the colorant layer. The thermal transfer recording sheet may further include a known black dye layer.

In the thermal transfer recording sheet, for example, but not limited to, layers of the respective dyes are formed on a base material in a face sequential form. For example, a yellow dye layer, a magenta dye layer, and a cyan dye layer are formed on a base material sheet so as to align along the moving direction of the base material sheet. This process is repeated to form the thermal transfer recording sheet. When this thermal transfer recording sheet is used, a series of image forming processes composed of formation of a yellow image, a magenta image, and a cyan image in this order is performed to form one full color image. This series of image forming processes is repeated. Furthermore, in addition to these multiple dye layers, a transferable protective layer can be formed in a face sequential form. A hot melt black layer may be formed.

The cyan dye layer contains, as a cyan dye, a compound represented by Formula (1a) or Formula (1b) and can further contain at least one compound selected from the group consisting of the compounds represented by Formulae (2) to (4).

The yellow dye layer can contain, as a yellow dye, at least one compound selected from the group consisting of the compounds represented by Formulae (9) to (12).

The magenta dye layer can contain, as a magenta dye, at least one compound selected from the group consisting of the compounds represented by Formulae (13) to (17).

In addition to the above-mentioned dyes, any known dye for thermal transfer that is sublimated and transferred by heat can also be used by being appropriately selected considering, for example, hue, printing sensitivity, light resistance, storage stability, and dissolubility with a binder.

The method of forming each of the colorant layers is not particularly limited, but the colorant layers contain the respective dyes and binder resins and are produced as follows.

The above-mentioned each dye, a binder resin, and optionally a surfactant and wax are gradually added to a solvent with stirring to be thoroughly mixed. Furthermore, a mechanical shear force is applied to the mixture with a disperser such that the composition is stably dissolved or dispersed in a microparticle form to prepare each ink. Subsequently, each ink is applied to a base film serving as the base material and is dried. As a result, each colorant layer can be produced on the base material. The ink can be applied at an amount such that the colorant layer has a dried thickness of 0.1 to 5 μm, from the viewpoint of transferability. Examples of the disperser include, but not limited to, media-type dispersers, such as a rotary shearing-type homogenizer, a ball mill, a sand mill, and an attritor; and a high-pressure opposite collision-type disperser.

Examples of the application to the base material include, but not limited to, methods using a bar coater, a gravure coater, a reverse roll coater, a rod coater, or an air doctor coater. In particular, a gravure coater can be used.

The solvent that can be used in the method of producing each layer is, for example, water or an organic solvent. Examples of the organic solvent include alcohols, such as methanol, ethanol, isopropanol, and isobutanol; cellosolves, such as methyl cellosolve and ethyl cellosolve; aromatic hydrocarbons, such as toluene, xylene, and chlorobenzene; esters, such as ethyl acetate and butyl acetate; ketones, such as acetone, methyl ethyl ketone, methyl isobutyl ketone, and cyclohexanone; halogenated hydrocarbons, such as methylene chloride, chloroform, and trichloroethylene; ethers, such as tetrahydrofuran and dioxane; N,N-dimethylformamide; and N-methylpyrrolidone. These organic solvents may be used alone or in combination of two or more thereof as needed.

The amount of each dye can be 50 to 300 parts by mass based on 100 parts by mass of the binder resin from the viewpoint of transferability, preferably 80 to 280 parts by mass, and more preferably 85 to 250 parts by mass. This amount when two or more dyes are used corresponds to the total amount of all the dyes.

Examples of the binder resin include water-soluble resins, such as a cellulose resin, polyacrylic acid, a starch resin, and an epoxy resin; and organic solvent-soluble resins, such as polyacrylate, polymethacrylate, polystyrene, polycarbonate, polyethersulfone, polyvinyl butyral, an ethyl cellulose resin, an acetyl cellulose resin, polyester, an AS resin, and a phenoxy resin. These resins may be used alone or in combination of two or more thereof as needed.

Other Components

The colorant layer may contain a surfactant for providing sufficient lubrication during the heating time of a thermal head (during printing). Examples of the surfactant include a cationic surfactant, an anionic surfactant, and a nonionic surfactant.

Examples of the cationic surfactant include dodecylammonium chloride, dodecylammonium bromide, dodecyltrimethylammonium bromide, dodecylpyridinium chloride, dodecylpyridinium bromide, and hexadecyltrimethylammonium bromide.

Examples of the anionic surfactant include fatty acid soap, such as sodium stearate and sodium dodecanoate; sodium dodecyl sulfate; sodium dodecylbenzene sulfate; and sodium lauryl sulfate.

Examples of the nonionic surfactant include dodecyl polyoxyethylene ether, hexadecyl polyoxyethylene ether, nonylphenyl polyoxyethylene ether, lauryl polyoxyethylene ether, sorbitan monooleate polyoxyethylene ether, and monodecanoyl sucrose.

The colorant layer may contain wax for providing sufficient lubrication during the non-heating time of a thermal head. Examples of the wax include, but not limited to, polyethylene wax, paraffin wax, and fatty acid ester wax.

The colorant layer may contain, in addition to the above-mentioned additives, an ultraviolet absorber, a preservative, an antioxidant, an antistatic, and a viscosity modifier, as needed.

The thermal transfer recording sheet can include a heat resistant lubricant layer on the surface opposite to the surface where the colorant layer of the base material is disposed, for enhancing the heat resistance and the mobility of the thermal head. The heat resistant lubricant layer is formed of a heat-resistant resin. Examples of the heat-resistant resin include polyvinyl butyral, polyvinyl acetal, polyester, polyether, polybutadiene, a vinyl chloride-vinyl acetate copolymer resin, a styrene-butadiene copolymer resin, polyurethane acrylate, polyester acrylate, polyimide, and polycarbonate.

The heat resistant lubricant layer can further contain, for example, a lubricant, a crosslinking agent, a release agent, heat resistance microparticles, and a binding agent. Examples of the lubricant include an amino-modified silicone compound and a carboxy-modified silicone compound. Examples of the heat resistance microparticles include silica. Examples of the binding agent include an acrylic resin. The materials contained in the heat resistant lubricant layer are not limited to these examples.

The heat resistant lubricant layer is formed by dissolving or dispersing the above-mentioned resin and additives in a solvent to prepare a coating solution for a heat resistant lubricant layer and applying the coating solution to a base material. Examples of the method of applying the coating solution for a heat resistant lubricant layer include methods using a bar coater, a gravure coater, a reverse roll coater, a rod coater, or an air doctor coater. In particular, a gravure coater can be used. The coating solution for a heat resistant lubricant layer can be applied at an amount such that the heat resistant lubricant layer has a dried thickness of 0.1 to 5 μm, from the viewpoint of transferability.

In the application, the drying can be performed, but not limited to, at 50° C. to 120° C. for about 1 second to 5 minutes. Insufficient drying causes scumming, offset of the dye ink in winding, or a kick-back of retransferring the offset dye ink to a dye layer of a different hue in rewinding.

Image Formation

In image formation using the thermal transfer recording sheet, the thermal transfer recording sheet and an image-receiving sheet having a colorant-receiving layer on a surface are stacked, and the thermal transfer recording sheet is heated. Consequently, the colorant in the thermal transfer recording sheet is sublimated and transferred onto the image-receiving sheet to form an image.

The thermal transfer recording sheet can be heated by, but not limited to, an ordinary method using a thermal head or a method using infrared or laser light. Alternatively, an energization heat generating film that generates heat by electrifying a base film itself serving as the base material can be used as an energization dye transfer sheet.

The present disclosure can provide a thermal transfer recording sheet that can form an image having compatibility between color gamut expansion in the blue direction and process black having a high optical density.

EXAMPLES

The present disclosure will now be described in more detail by examples and comparative examples, but is not limited to the examples. The term "part(s)" in this text refers to part(s) by mass unless otherwise specified.

Identification of resulting compounds was performed with a $^1$H nuclear magnetic resonance ($^1$H-NMR) spectroscopy apparatus (ECA-400, manufactured by JEOL Ltd.) and an LC/TOF MS apparatus (LC/MSD TOF, manufactured by Agilent Technologies).

Production of Compounds Represented by Formula (1a) or Formula (1b) or Formula (2)

Compounds having the structures represented by Formula (1a) or Formula (1b) can be synthesized by a known method.

Comparative Compound

As comparative compounds, the following compounds was used.

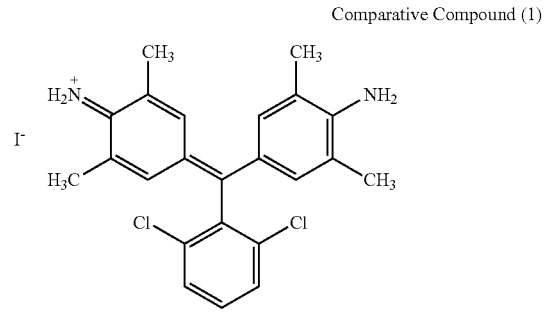

Comparative Compound (1)

Production of Thermal Transfer Recording Sheet

Cyan Ink Preparation Example 1

Five parts of polyvinyl butyral (Denka 3000-K, manufactured by Denka Co. Ltd.) was gradually added to a solution mixture of 45 parts of methyl ethyl ketone and 45 parts of toluene and was dissolved therein. Five parts of Compound (A21) was added to the solution and was completely dissolved therein to prepare Cyan Ink (C1) for producing a thermal transfer recording sheet.

Cyan Ink Preparation Examples 2 to 16

Cyan Inks (C2) to (C21) were prepared as in Cyan ink preparation example 1 except that the cyan dye in Cyan ink preparation example 1 was changed to the cyan dyes and blending ratios shown in Table 1. In a cyan ink containing a plurality of colorant, the total amount of the colorant was adjusted to 5 parts.

TABLE 1

|     | Cyan dye Formula (1a) or Formula (1b) | Cyan dye Formula (2) | Cyan dye Formula (3) | Cyan dye Formula (4) | Blending ratio |
|-----|---------------------------------------|----------------------|----------------------|----------------------|----------------|
| C1  | Compound (A21) | | | | 1:0:0:0 |
| C2  | Compound (A22) | | | | 1:0:0:0 |
| C3  | Compound (A23) | | | | 1:0:0:0 |
| C4  | Compound (A24) | | | | 1:0:0:0 |
| C5  | Compound (A17) | | | | 1:0:0:0 |
| C6  | Compound (A18) | | | | 1:0:0:0 |
| C7  | Compound (A21) | | Compound (42) | | 1:0:1:0 |
| C8  | Compound (A23) | Compound (38) | Compound (43) | | 2:1:1:0 |
| C9  | Compound (A29) | Compound (38) | Compound (42) | | 2:1:1:0 |
| C10 | Compound (A24) | Compound (38) | Compound (42) | | 4:1:2:0 |
| C11 | Compound (A17) | Compound (38) | Compound (43) | Compound (49) | 2:1:1:1 |
| C12 | Compound (A18) | Compound (38) | Compound (42) | Compound (50) | 2:1:1:2 |
| C13 | Compound (A37) | Compound (38) | | Compound (49) | 2:1:0:1 |
| C14 | Compound (A38) | Compound (38) | Compound (42) | Compound (49) | 2:1:1:1 |
| C15 | Compound (A39) | | | Compound (49) | 2:0:0:2 |
| C16 | Compound (A40) | Compound (38) | Compound (42) | Compound (49) | 4:1:1:1 |
| C17 | Compound(A41)  | Compound (38) | Compound (42) | Compound (49) | 4:1:2:1 |
| C18 | Comparative Compound (A1) | | | | 1:0:0:0 |
| C19 | Comparative Compound (A1) | Compound (38) | Compound (43) | | 2:1:1:0 |

Yellow Ink Preparation Examples 1 to 3

Yellow Inks (Y1) to (Y3) were prepared as in Cyan ink preparation example 1 except that the yellow dyes and blending ratios shown in Table 2 were used. The amount of the colorant was adjusted to 5 parts in total.

TABLE 2

|    | Yellow dye Formula (9) | Yellow dye Formula (10) | Yellow dye Formula (11) | Yellow dye Formula (12) | Yellow dye Compound (91) | Blending ratio |
|----|------------------------|-------------------------|-------------------------|-------------------------|--------------------------|----------------|
| Y1 | Compound (57) | Compound (71) | Compound (85) | | | 1:2:0:1:0 |
| Y2 | Compound (57) | Compound (71) | Compound (77) | Compound (90) | | 1:1:1:1:0 |
| Y3 | | Compound (71) | Compound (77) | | Compound (91) | 0:2:2:0:1 |

Magenta Ink Preparation Examples 1 to 3

Magenta Inks (M1) to (M3) were prepared as in Cyan ink preparation example 1 except that the magenta dyes and blending ratios shown in Table 3 were used. The amount of the colorant was adjusted to 5 parts in total.

TABLE 3

|    | Magenta dye Formula (13) | Magenta dye Formula (14) | Magenta dye Formula (15) | Magenta dye Formula (16) | Magenta dye Formula (17) | Blending ratio |
|----|--------------------------|--------------------------|--------------------------|--------------------------|--------------------------|----------------|
| M1 | Compound (93) | Compound (104) | | | Compound (129) | 2:2:0:0:1 |
| M2 | Compound (95) | Compound (108) | Compound (114) | | | 2:2:1:0:0 |
| M3 | | Compound (109) | Compound (115) | Compound (122) | Compound (135) | 0:1:1:1:1 |

Example 1

A polyethylene terephthalate film (Lumirror, manufactured by Toray Industries, Inc.) having a thickness of 4.5 μm was used as the base material. Yellow Inks (Y1) for producing a thermal transfer recording sheet was applied onto the base material such that the dried thickness was 1 μm, followed by drying to form a yellow dye layer.

Subsequently, a magenta dye layer was formed as in the yellow dye layer in a region next to the yellow dye layer except that Magenta Ink (M1) was used instead of Yellow Inks (Y1). Similarly, a cyan dye layer was formed using Cyan Ink (C1) in a region next to the magenta dye layer. Thus, a thermal transfer recording sheet including a colorant layer composed of the yellow dye layer, the magenta dye layer, and the cyan dye layer was produced.

An image sample of Example 1 was produced using the thermal transfer recording sheet with a modification of Selphy manufactured by CANON KABUSHIKI KAISHA.

An image in combination of yellow (Y), magenta (M), and cyan (C) of which the printing outputs were each changed from 0% to 100% in increments of 10% was output as an image sample.

Examples 2 to 16 and Comparative Examples 1 to 42

Each thermal transfer recording sheet including a yellow dye layer, a magenta dye layer, and a cyan dye layer was produced as in Example 1 except that the color inks were changed to those shown in Table 4. Image samples of Examples (2) to (16) and image samples of Comparative Examples (1) to (42) were produced using the resulting respective thermal transfer recording sheets.

Evaluation

Color Gamut in the Blue Direction

The chromaticities (a*, b*) in the L*a*b* color system of primary color and secondary color portions in each image sample were measured with a reflection densitometer SpectroLino (manufactured by Gretag Macbeth) under conditions of a light source D50 and a view field of 2°.

The color gamut expansion in the blue direction in the L*a*b* color system is expressed as the minimum value of b* when a* is 0. Accordingly, among the measurement values of all combinations, the minimum value of b* when a* was 0 was used as the evaluation value in each Example.

The evaluation criteria of color gamut expansion in the blue direction are shown below. The results of the evaluation are shown in Table 4. When the rank was B or higher, it was judged that the effects of the present disclosure were achieved.

A: (minimum b* value at a*=0)≤−75
B: −75<(minimum b* value at a*=0)≤−50
C: −50<(minimum b* value at a*=0)

Optical Density of Process Black

The optical density O.D. of the process black portion was measured with a reflection densitometer SpectroLino (manufactured by Gretag Macbeth) under conditions of a light source D50 and a view field of 2°. Among the measurement values of all combinations of tertiary color portion in each image sample, the maximum O.D. value was used as the evaluation value in each Example.

The evaluation criteria of optical density of process black are shown below. The results of the evaluation are shown in Table 4. When the rank was B or higher, it was judged that the effects of the present disclosure were achieved.

A: 2.1≤O.D.
B: 1.9≤O.D.<2.1
C: O.D.<1.9

TABLE 4

|  | Ink | | | Results of image evaluation | | | |
|---|---|---|---|---|---|---|---|
|  | Yellow dye layer | Magenta dye layer | Cyan dye layer | Color gamut in the blue direction minimum b* value when a* is 0 | Evaluation | Black O.D. | Evaluation |
| Example 1 | Y1 | M1 | C1 | −74 | B | 2.42 | A |
| Example 2 | Y2 | M1 | C2 | −81 | A | 2.25 | A |
| Example 3 | Y3 | M2 | C3 | −73 | B | 2.31 | A |
| Example 4 | Y1 | M2 | C4 | −69 | B | 2.41 | A |
| Example 5 | Y1 | M3 | C5 | −71 | B | 2.10 | A |
| Example 6 | Y1 | M3 | C6 | −82 | A | 2.21 | A |
| Example 7 | Y3 | M1 | C7 | −65 | B | 2.35 | A |
| Example 8 | Y2 | M1 | C8 | −63 | B | 2.21 | A |
| Example 9 | Y2 | M2 | C9 | −58 | B | 2.21 | A |
| Example 10 | Y2 | M2 | C10 | −60 | B | 2.09 | B |
| Example 11 | Y3 | M3 | C11 | −58 | B | 2.21 | A |
| Example 12 | Y3 | M3 | C12 | −55 | B | 2.19 | A |
| Example 13 | Y1 | M1 | C13 | −73 | B | 2.23 | A |
| Example 14 | Y2 | M1 | C14 | −62 | B | 2.04 | B |
| Example 15 | Y3 | M1 | C15 | −82 | A | 2.30 | A |
| Example 16 | Y1 | M1 | C16 | −59 | B | 2.03 | B |
| Example 17 | Y1 | M1 | C17 | −78 | B | 2.31 | A |
| Comparative Example 1 | Y1 | M2 | C18 | −48 | C | 1.80 | C |
| Comparative Example 2 | Y2 | M1 | C19 | −44 | C | 1.78 | C |

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-247122 filed Dec. 20, 2016 and Japanese Patent Application No. 2017-213857 filed Nov. 6, 2017, which are hereby incorporated by reference herein in their entirety.

What is claimed is:

1. A thermal transfer recording sheet for forming process black by combining a yellow dye, a magenta dye, and a cyan dye, comprising:

a base material; and a colorant layer on the base material, wherein the colorant layer includes a yellow dye layer containing the yellow dye, a magenta dye layer containing the magenta dye, and a cyan dye layer containing the cyan dye;

the yellow dye layer, the magenta dye layer and the cyan dye layer are aligned side by side on the base material; and the cyan dye comprises a compound represented by Formula (1a) or Formula (1b):

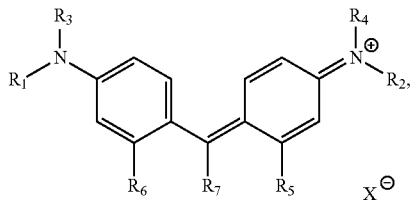

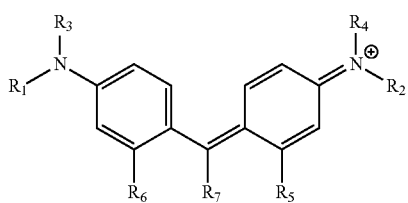

where $R_1$ and $R_2$ each independently represent an alkyl group, a substituted or unsubstituted aryl group, or a benzyl group;
$R_3$ and $R_4$ each independently represent a hydrogen atom, an alkyl group, a substituted or unsubstituted aryl group, or a benzyl group;
$R_5$ and $R_6$ each independently represent a hydrogen atom, or an alkyl group;
$R_7$ represents a substituted or unsubstituted aryl group, or a substituted or unsubstituted heteroaromatic group;
$X^-$ represents an anion;
the compound represented by Formula (1b) has at least one anionic substituent; and
the magenta dye comprises at least one compound selected from the group consisting of compounds represented by Formulae (16) and (17):

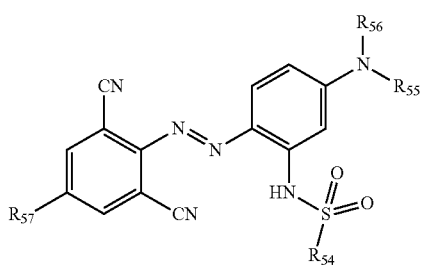

where $R_{54}$ to $R_{57}$ each independently represent an alkyl group, or a substituted or unsubstituted aryl group;

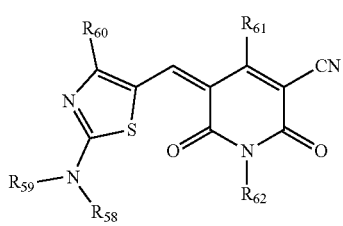

where $R_{58}$ and $R_{59}$ each independently represent an alkyl group; $R_{60}$ represents a hydrogen atom, an alkyl group, or a substituted or unsubstituted aryl group; $R_{61}$ represents an alkyl group, or a substituted or unsubstituted aryl group; $R_{62}$ represents a hydrogen atom, an alkyl group, a substituted or unsubstituted aryl group, or —N(—$R_{63}$)$R_{64}$ where $R_{63}$ and $R_{64}$ each independently represent a hydrogen atom, an alkyl group, an aryl group, or an acyl group, and $R_{63}$ and $R_{64}$ are optionally bonded to each other to form a ring.

2. The thermal transfer recording sheet according to claim 1, wherein the cyan dye further comprises at least one compound selected from the group consisting of compounds represented by Formulae (2) to (4):

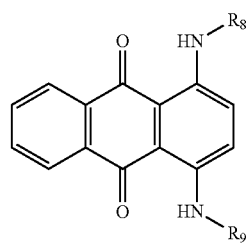

where $R_8$ and $R_9$ each independently represent an alkyl group, or a substituted or unsubstituted aryl group;

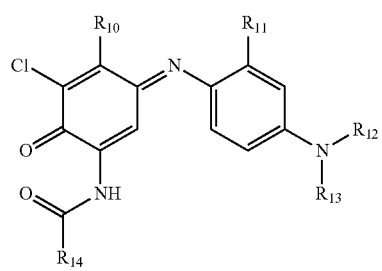

where $R_{10}$ to $R_{14}$ each independently represent an alkyl group, or a substituted or unsubstituted aryl group;

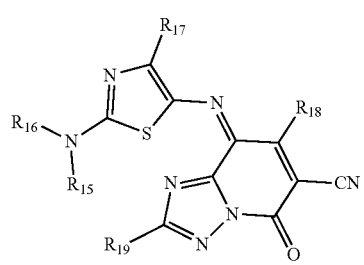

where $R_{15}$ to $R_{19}$ each independently represent an alkyl group, or a substituted or unsubstituted aryl group.

3. The thermal transfer recording sheet according to claim 1, wherein $R_7$ in Formula (1a) and Formula (1b) represents a substituted phenyl group, a substituted naphthyl group, or a substituted indolyl group.

4. The thermal transfer recording sheet according to claim 1, wherein $R_7$ in Formula (1a) and Formula (1b) represents a group represented by any of Formulae (5) to (7):

(5)
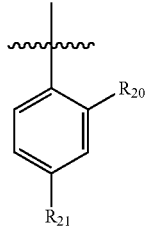

(6)
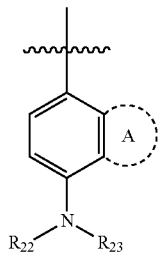

(7)
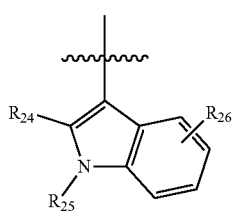

in Formula (5), $R_{20}$ represents a sulfonyl group, a halogen atom, a perfluoroalkyl group, or a nitro group; and $R_{21}$ represents a hydrogen atom or a sulfonyl group, in Formula (6), $R_{22}$ and $R_{23}$ each independently represent a hydrogen atom, an alkyl group, a substituted or unsubstituted aryl group, or a benzyl group; and A optionally has a benzene ring or a cyclohexyl ring, in Formula (7), $R_{24}$ and $R_{25}$ each independently represent an alkyl group, or a substituted or unsubstituted aryl group; and $R_{26}$ represents a hydrogen atom, an alkyl group, or a substituted or unsubstituted aryl group.

5. The thermal transfer recording sheet according to claim 4, wherein $R_7$ in Formula (1a) and Formula (1b) represents a group represented by any of Formulae (5) to (7):

(5)
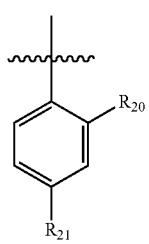

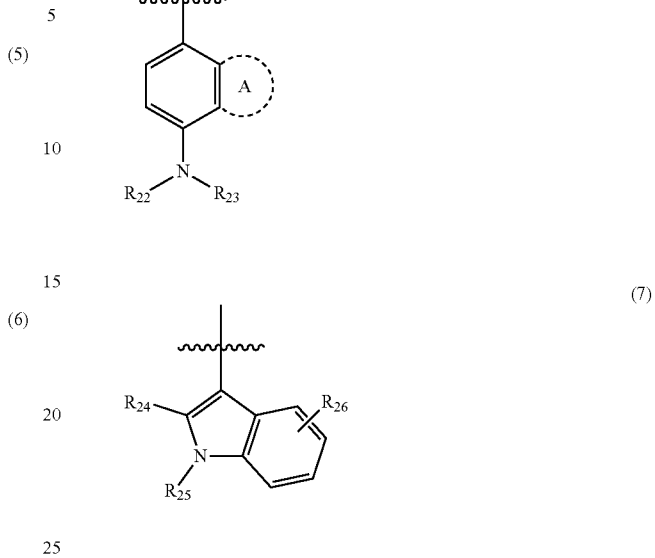

in Formula (5), $R_{20}$ represents a sulfonyl group, a halogen atom, or a perfluoroalkyl group; and $R_{21}$ represents a hydrogen atom or a sulfonyl group, in Formula (6), $R_{22}$ and $R_{23}$ each independently represent a hydrogen atom, an alkyl group, a substituted or unsubstituted aryl group, or a benzyl group; and A optionally has a benzene ring or a cyclohexyl ring, in Formula (7), $R_{24}$ and $R_{25}$ each independently represent an alkyl group, or a substituted or unsubstituted aryl group; and $R_{26}$ represents a hydrogen atom, an alkyl group, or a substituted or unsubstituted aryl group.

6. The thermal transfer recording sheet according to claim 1, wherein $R_7$ in Formula (1a) and Formula (1b) represents a group represented by Formula (8):

(8)
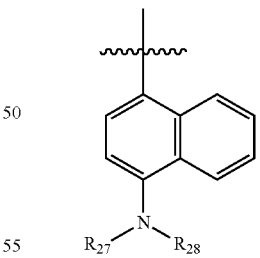

where $R_{27}$ and $R_{28}$ each independently represent a hydrogen atom, an alkyl group, a substituted or unsubstituted aryl group, or a benzyl group.

7. The thermal transfer recording sheet according to claim 1, wherein the yellow dye comprises at least one compound selected from the group consisting of compounds represented by Formulae (9) to (12):

(9)

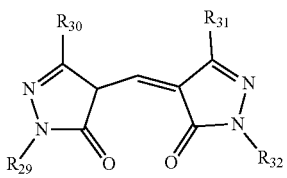

where $R_{29}$ to $R_{32}$ each independently represent an alkyl group, or a substituted or unsubstituted aryl group;

(10)

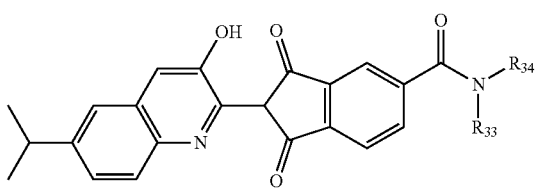

where $R_{33}$ and $R_{34}$ each independently represent an alkyl group, or a substituted or unsubstituted aryl group;

(11)

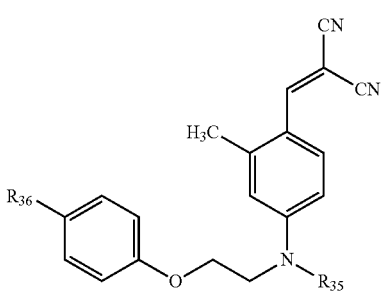

where $R_{35}$ and $R_{36}$ each independently represent an alkyl group, or a substituted or unsubstituted aryl group;

(12)

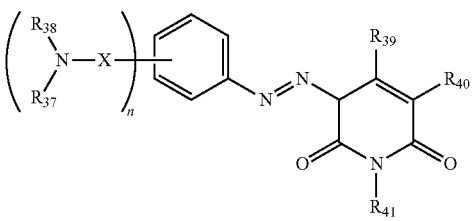

where
$R_{37}$ represents an alkyl group; $R_{38}$ represents a hydrogen atom or an alkyl group;
$R_{39}$ represents an alkyl group, a substituted or unsubstituted aryl group, or an amino group; $R_{40}$ represents a hydrogen atom, a cyano group, a carbamoyl group, an alkoxycarbonyl group, or a carboxylic acid amide group;
$R_{41}$ represents a hydrogen atom, an alkyl group, a substituted or unsubstituted aryl group, or —N(—$R_{42}$)$R_{43}$ where $R_{42}$ and $R_{43}$ each independently represent a hydrogen atom, an alkyl group, or an acyl group, and $R_{42}$ and $R_{43}$ are optionally bonded to each other to form a ring;

X represents a carbonyl group, or a sulfonyl group; and n represents an integer of 1 to 3.

8. A thermal transfer recording sheet for forming process black by combining a yellow dye, a magenta dye, and a cyan dye, comprising:
   a base material; and
   a colorant layer on the base material, wherein
   the colorant layer includes a yellow dye layer containing the yellow dye, a magenta dye layer containing the magenta dye, and a cyan dye layer containing the cyan dye;
   the yellow dye layer, the magenta dye layer and the cyan dye layer are aligned side by side on the base material; and
   the cyan dye comprises a compound represented by Formula (1a) or Formula (1 b):

(1a)

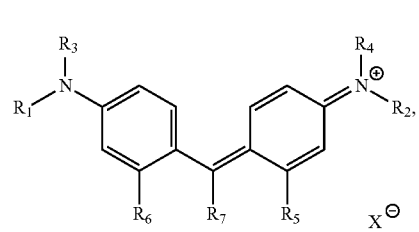

(1b)

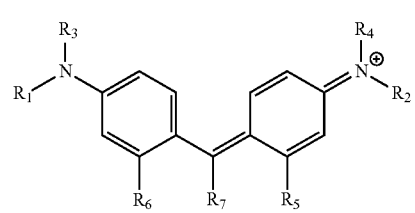

where $R_1$ and $R_2$ each independently represent an alkyl group, a substituted or unsubstituted aryl group, or a benzyl group;
$R_3$ and $R_4$ each independently represent a hydrogen atom, an alkyl group, a substituted or unsubstituted aryl group, or a benzyl group;
$R_5$ and $R_6$ each independently represent a hydrogen atom, or an alkyl group;
$R_7$ represents a substituted or unsubstituted aryl group, or a substituted or unsubstituted heteroaromatic group;
X$^-$ represents an anion;
the compound represented by Formula (1b) has at least one anionic substituent; and
the cyan dye further comprises at least one compound selected from compounds represented by Formula (4):

(4)

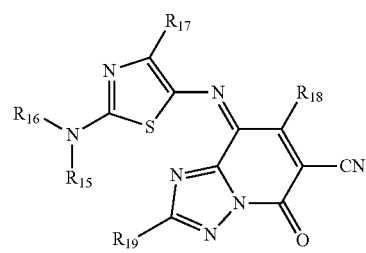

where $R_{15}$ to $R_{19}$ each independently represent an alkyl group, or a substituted or unsubstituted aryl group.

9. A thermal transfer recording sheet for forming process black by combining a yellow dye, a magenta dye, and a cyan dye, comprising:
a base material; and
a colorant layer on the base material, wherein the colorant layer includes a yellow dye layer containing the yellow dye, a magenta dye layer containing the magenta dye, and a cyan dye layer containing the cyan dye;
the yellow dye layer, the magenta dye layer and the cyan dye layer are aligned side by side on the base material; and
the cyan dye comprises a compound represented by Formula (1a) or Formula (1 b):

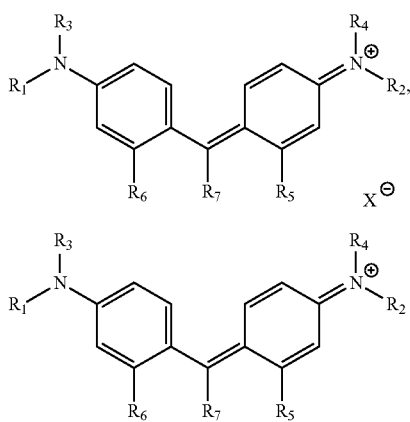

where $R_1$ and $R_2$ each independently represent an alkyl group, a substituted or unsubstituted aryl group, or a benzyl group;
$R_3$ and $R_4$ each independently represent a hydrogen atom, an alkyl group, a substituted or unsubstituted aryl group, or a benzyl group;
$R_5$ and $R_6$ each independently represent a hydrogen atom, or an alkyl group;
$R_7$ represents a substituted or unsubstituted aryl group, or a substituted or unsubstituted heteroaromatic group;
$X^-$ represents an anion;
the compound represented by Formula (1 b) has at least one anionic substituent; and
the yellow dye comprises at least one compound selected from compounds represented by Formula (12):

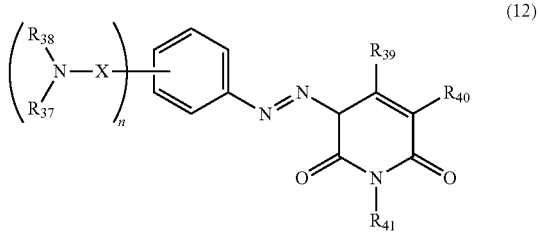

where
$R_{37}$ represents an alkyl group; $R_{38}$ represents a hydrogen atom or an alkyl group;
$R_{39}$ represents an alkyl group, a substituted or unsubstituted aryl group, or an amino group; $R_{40}$ represents a hydrogen atom, a cyano group, a carbamoyl group, an alkoxycarbonyl group, or a carboxylic acid amide group;
$R_{41}$ represents a hydrogen atom, an alkyl group, a substituted or unsubstituted aryl group, or —N(—$R_{42}$)$R_{43}$ where
$R_{42}$ and $R_{43}$ each independently represent a hydrogen atom, an alkyl group, or an acyl group, and $R_{42}$ and $R_{43}$ are optionally bonded to each other to form a ring;
X represents a carbonyl group, or a sulfonyl group; and n represents an integer of 1 to 3.

* * * * *